(12) United States Patent
Krishnan

(10) Patent No.: US 11,645,522 B2
(45) Date of Patent: May 9, 2023

(54) METHOD AND SYSTEM USING MACHINE LEARNING FOR PREDICTION OF STOCKS AND/OR OTHER MARKET INSTRUMENTS PRICE VOLATILITY, MOVEMENTS AND FUTURE PRICING BY APPLYING RANDOM FOREST BASED TECHNIQUES

(71) Applicant: Dhruv Siddharth Krishnan, Tampa, FL (US)

(72) Inventor: Dhruv Siddharth Krishnan, Tampa, FL (US)

( * ) Notice: Subject to any disclaimer, the term of this patent is extended or adjusted under 35 U.S.C. 154(b) by 637 days.

(21) Appl. No.: 16/783,457

(22) Filed: Feb. 6, 2020

(65) Prior Publication Data

US 2020/0202436 A1 Jun. 25, 2020

Related U.S. Application Data

(60) Provisional application No. 62/814,062, filed on Mar. 5, 2019.

(51) Int. Cl.
| | |
|---|---|
| *G06N 3/08* | (2023.01) |
| *G06Q 40/04* | (2012.01) |
| *G06N 20/20* | (2019.01) |
| *G06N 3/045* | (2023.01) |
| *G06N 3/047* | (2023.01) |

(52) U.S. Cl.
CPC ............. *G06N 3/08* (2013.01); *G06N 3/045* (2023.01); *G06N 3/047* (2023.01); *G06N 20/20* (2019.01); *G06Q 40/04* (2013.01)

(58) Field of Classification Search
None
See application file for complete search history.

(56) References Cited

U.S. PATENT DOCUMENTS

| | | | |
|---|---|---|---|
| 10,185,996 B2 * | 1/2019 | Lee | G06Q 40/06 |
| 10,360,631 B1 * | 7/2019 | Jezewski | G06Q 50/01 |
| 10,614,073 B2 * | 4/2020 | Zhang | G06F 16/2457 |
| 11,341,573 B1 * | 5/2022 | Fiedler | G10L 15/1815 |

(Continued)

OTHER PUBLICATIONS

Pang, X., Zhou, Y., Wang, P. et al., "An innovative neural network approach for stock market prediction", published Jan. 12, 2018, pp. 2098-2118. (Year: 2018).*

(Continued)

*Primary Examiner* — Mohammad Z Shaikh
(74) *Attorney, Agent, or Firm* — Diederiks & Whitelaw, PLC.

(57) ABSTRACT

A method for providing stock predictive information by a cloud-based computing system implementing a random forest algorithm via a machine learning model by receiving a set of stock data from multiple sources of stock data wherein the set of stock data at least comprises stock prices at the open and close of a market, changes in stock prices during the open and close of a market, and real-time stock data; defining a range in time contained in a window defined of an initial selected month, a day or real-time period and an end of the selected month, day and real-time period; applying the random forest model to the set of stock data by creating multiple decision trees to predict a stock price in a quantified period, amount or percentage change in a stock price; and presenting the predicted stock price in a graphic user interface to an user.

20 Claims, 21 Drawing Sheets

(56) References Cited

U.S. PATENT DOCUMENTS

| | | | | |
|---|---|---|---|---|
| 2010/0005034 | A1* | 1/2010 | Carpenter | G06Q 40/06 705/36 R |
| 2010/0114794 | A1* | 5/2010 | Lakshminarayan ... | G06Q 40/00 705/36 R |
| 2010/0179930 | A1* | 7/2010 | Teller | G06N 20/00 706/12 |
| 2011/0112983 | A1* | 5/2011 | Wu | G06Q 40/06 705/36 R |
| 2012/0226645 | A1* | 9/2012 | O'Rourke | G06Q 40/06 706/46 |
| 2016/0098992 | A1* | 4/2016 | Renard | G10L 15/30 704/275 |
| 2016/0269378 | A1* | 9/2016 | Ye | G06N 3/045 |
| 2017/0357480 | A1* | 12/2017 | La Placa | G06N 5/02 |
| 2017/0357901 | A1* | 12/2017 | La Placa | G06Q 10/00 |
| 2017/0372429 | A1* | 12/2017 | La Placa | G06F 16/9535 |
| 2018/0129943 | A1* | 5/2018 | La Placa | G06Q 10/00 |
| 2018/0143803 | A1* | 5/2018 | La Placa | G06Q 40/04 |
| 2018/0341685 | A1* | 11/2018 | Indyk | G06F 16/90332 |
| 2019/0087707 | A1* | 3/2019 | Cummins | G06F 40/205 |
| 2019/0228015 | A1* | 7/2019 | Assia | G06F 16/00 |
| 2019/0295544 | A1* | 9/2019 | Garcia | G10L 15/08 |
| 2019/0311036 | A1* | 10/2019 | Shanmugam | G06F 40/35 |
| 2020/0201913 | A1* | 6/2020 | Terry | G06Q 30/0281 |
| 2020/0234373 | A1* | 7/2020 | Graver | G06F 3/167 |
| 2020/0272791 | A1* | 8/2020 | Jonnalagadda | G06F 40/295 |

OTHER PUBLICATIONS

Zheng-Lin, Xao et al, "FinBrain: When Finance Meets AI 2.0", Frontiers of Information Technology Electronic Engineering, Aug. 25, 2018, pp. 1-11. (Year: 2018).*

Fischer, Thomas; Krauss, Christopher, "Deep Learning with long short-term memory networks for financial market predictions", European Journal of Operation Research, vol. 270, 2018, pp. 654-669. (Year: 2018).*

Fischer, Thomas; Do, Anh, Xuan; Huck, Nicholas, , "Deep Neural Networks, gradient boosted trees, random forests: Statistical arbitrage on the S&P 500", European Journal of Operation Research, vol. 259, 2018, pp. 689-702. (Year: 2018).*

Patel, Janki et al, "Stock Price Prediction Using RNN and LSTM", www.jetir.org, vol. 5, issue 11, Nov. 2018, pp. 1-11. (Year: 2018).*

Y. Jiao and J. Jakubowicz, "Predicting stock movement direction with machine learning: An extensive study on S&P 500 stocks," 2017 IEEE International Conference on Big Data (Big Data), 2017, pp. 4705-4713. (Year: 2017).*

Liu, Huicheng, "Leveraging Financial News for Stock Trend Prediction with Attention-Based Recurrent Neural Network", Department of Electrical Engineering, Queen's University, Canada, Kingston ON, Canada K7L2N8, Nov. 15, 2018, pp. 1-24. (Year: 2018).*

* cited by examiner

| Performance | Risk Metrics | Total Returns | Source Code | | |
|---|---|---|---|---|---|
| Overall Metrics | | | | Alpha | Beta |
| Returns | | 1.38 | | 0.11 | 3.16 |
| Alpha | | Sharpe | | Sortino | Max Drawdown |
| Beta | | 1.09 | | 1.55 | -0.38 |
| Sharpe | | | | Volatility | |
| Volatility | | 0.35 | | 0.56 | |
| Max Drawdown | | | | | |

FIG. 20

METHOD AND SYSTEM USING MACHINE LEARNING FOR PREDICTION OF STOCKS AND/OR OTHER MARKET INSTRUMENTS PRICE VOLATILITY, MOVEMENTS AND FUTURE PRICING BY APPLYING RANDOM FOREST BASED TECHNIQUES

CROSS-REFERENCE TO RELATED APPLICATIONS

This application claims priority to the U.S. Provisional Patent Application 62/814,062, filed Mar. 5, 2019, the contents of which are hereby incorporated by reference.

TECHNICAL FIELD

Embodiments of the subject matter described herein relate generally to financial analytical tools, and more particularly, embodiments of the subject matter relate to a system and method for an automated process implementing machine learning techniques using random forest solutions to predict stock and various other market instruments volatility and price movements.

BACKGROUND

The stock market, time and time again has proven the best place to invest and grow wealth. Without proper access, most of the public will not have the opportunity to realize profits that are now becoming only available to a lesser part of society i.e. a select populace of high net worth individuals.

The advent of algorithmic trading has gained widespread acceptance with Wall Street trading professionals and has been proven to show reductions in risks that result from manual errors, as well as enabling accurate trades that can be correctly timed and instantly executed to minimize potential price fluctuations. Further, the instant automated placement of trade orders by algorithmic-based software applications not only results in trades that are executed at a high rate of accuracy but also trades that can occur at the best possible prices available giving the investor who is generally large institutions like hedge funds an advantage to make profitable trades. The result of this automated trading has been that the individual investor and for that matter, the general public has been left out and can no longer compete on an equal playing field with the commercial funds on Wall Street.

A random forest is a machine learning solution that implements a set of decision trees to classify datasets and can be used for financial modeling to forecast stock trends. forecasts. That is, stock data can be collected and interpreted by applying a machine learning decision-making model using a trained neural network to make predictive decision making on whether to buy, sell, or hold a stock. The trained neural network may be formed by supervised or unsupervised learning on a dataset collected over various periods. The trained machine learning model can be used to predict price volatility and future price changes of stocks. The application of random forest techniques can enable using decision trees to create a complex machine learning algorithm that relies on data and statistics for making market predictions.

There are a host of portfolio stock trading apps and websites that in general have user interfaces that are not particularly intuitive and require manual touch inputs for trading. As trading decisions become more complex and longer created trade operations are needed, the current type of user interfaces is not convenient. Moreover, other interfaces including voice recognition application are available on the market on standalone hardware devices. For example, GOOGLE® HOME™ hardware product with GOGGLE® ASSISTANT™ voice recognition software and AMAZON® ECHO® line of hardware products with ALEXA® voice recognition software can provide a human speech interface that can allow formulating of complex stock trades with executions of various machine learning applications for trade executions alone or with trading accounts at websites such as ETRADE® and apps such as ROBINHOOD®.

It is desirable to enable public access to algorithmic machine learning solutions not only to demystify the stock market but also to make it the playing field more level, more easily accessible and understandable to the general public.

It is desirable for an implementing machine learning algorithm to be used specifically in ways that will enable classifying and implementing stock trading strategies of companies that are focusing on the health and well-being of the general public by collecting data about such companies using a trained neural network model and implementing short term and long term strategies for investors to invest in such market sectors to enable the companies doing good to flourish and to fund global humanitarian efforts and projects that are not easily discoverable or quantifiable as investments, particularly for risk-averse clients. Likewise, it is desired to enable more open machine learning strategies that can be applicable to schools, universities, hospitals, and individuals in the education and knowledge areas.

Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method and system for the machine learning model using random forest algorithms to predict stock and various other market instrument's volatility and price movements.

In an exemplary embodiment, a method for providing stock predictive information by a cloud-based computing system implementing a random forest algorithm is provided. The method includes: executing a random forest application connected to a voice actuated software package in a cloud-based computing system by user voice actuation wherein the random forest application contains a machine learning model for implementing the random forest algorithm; receiving a set of stock data from multiple sources of stock data including brokerage accounts, content sources, and stock quote providers wherein the set of stock data at least includes stock prices at the open and close of a market, changes in stock prices during the open and close of a market, and real-time stock data; identifying a stock of interest contained in the set of stock data; defining a range in time of the set of stock data wherein the range in time includes: a set of stock data contained in a window defined of an initial selected month, a day or real-time period and an end of the selected month, day and real-time period; applying the random forest model to the set of stock data by creating multiple decision trees to predict a stock price in a quantified period, amount or percentage change in a stock price; presenting the predicted stock price in a graphic user interface; and providing alerts, messages or notifications on a display contained within the graphic user interface so that a user can trade on the stock in an anticipation of a predicted change in the stock price.

In various exemplary embodiments, the method includes the random forest model further including: training a prediction model based on supervised and unsupervised learning of the set of data wherein at least the supervised model uses data results that are within a range selected by a user. The random forest model further including: training an estimation model based on supervised and unsupervised learning of the set of data wherein at least the supervised model uses data results that are within a range selected by a user.

The method further including: selecting a number for a set of decision trees for implementation of the estimation and the prediction models wherein each decision tree receives stock data for processing to predict or estimate a change in the stock price in a selected period. The method further including: implementing a security check of the random forest application connected to the cloud-based application. The method further including: selecting one or more of a set of rules for stock selection time periods or for intraday stock movements of the set of stock of processing by the random forest application. The method further including: applying natural language processing solutions for receiving input stock data for triggering the random forest application wherein the random forest application is connected to an independent natural language processing module for receiving voice commands and sending voice results to a user.

The method further including processing by the random forest application, one or more target stocks and a corresponding target stock related information based on stock indicators including at least one of a simple moving average, a relative strength index, a moving average convergence divergence signal, an exponential weighted moving average, and a Bollinger band. The method further including: training a neural network using random forest application with actual inputs for a pre-set number of hidden layers in the neural network wherein each hidden layer including a sample size segregated into at least two other hidden layers denoting stock change predictions of long and short.

In another exemplary embodiment, a cloud-based computing system implementing a decision tree model configured using a random forest algorithm for stock change predictions is provided. The system includes a random forest application that when executed by a hardware-based processing system is configurable to cause: implement of a machine learning model for implementing the random forest algorithm to receive a set of stock data from multiple sources of stock data including brokerage accounts, content sources, and stock quote providers wherein the set of stock data at least includes stock prices at the open and close of a market, changes in stock prices during the open and close of a market, and real-time stock data; identify a stock of interest contained in the set of stock data; define a range in time of the set of stock data wherein the range in time includes: a set of stock data contained in a window defined of an initial selected month, a day or real-time period and an end of the selected month, day and real-time period; apply a random forest model to the set of stock data to predict a stock price in a quantified period, amount or percentage change in a stock price; present changes in the predicted stock price in a graphic user interface; and provide alerts, messages or notifications on a display contained within the graphic user interface for a user to make trading decisions of a stock based on a predicted change in the stock price in a select time period.

In various exemplary embodiments, the cloud-based computing system further includes the random forest application that when executed by a hardware-based processing system is configurable to cause: implement of a machine learning model for implementing the random forest algorithm to train a prediction model based on supervised and unsupervised learning of the set of data wherein at least the supervised model uses data results that are within a range selected by a user. The cloud-based computing system further including the random forest application that when executed by a hardware-based processing system is configurable to cause: implement of a machine learning model for implementing the random forest algorithm to train an estimation model based on supervised and unsupervised learning of the set of data wherein at least the supervised model uses data results that are within a range selected by a user.

The cloud-based computing system according further including the random forest application that when executed by a hardware-based processing system is configurable to cause: implement of a machine learning model for implementing the random forest algorithm to: select a number for the set of decision trees for implementation of the estimation and the prediction models wherein each decision trees receives stock data for processing to predict or estimate a change in stock price in a selected period.

The cloud-based computing system further including the random forest application that when executed by a hardware-based processing system is configurable to cause: implement a machine learning model for implementing the random forest algorithm to configure a security check prior to the execution of the random forest application connected to the cloud-based application. The cloud-based computing system further including the random forest application that when executed by a hardware-based processing system is configurable to cause: implement of a machine learning model for implementing the random forest algorithm to select one or more of a set of rules for stock selection time periods or for intraday stock movements of the set of stock of processing by the random forest application.

The cloud-based computing system further including the random forest application that when executed by a hardware-based processing system is configurable to cause: implement of a machine learning model for implementing the random forest algorithm to: apply natural language processing solutions to receive input stock data to trigger the random forest application wherein the random forest application is connected to an independent natural language processing module to receive voice commands and to send voice results to an user.

The cloud-based computing system further including the random forest application that when executed by a hardware-based processing system is configurable to cause: implement of a machine learning model for implementing the random forest algorithm to train a neural network using the random forest application with actual inputs for a pre-set number of hidden layers in the neural network wherein each hidden layer including a sample size segregated into at least two other hidden layers denoting stock change predictions of long and short. The cloud-based computing system further including the random forest application that when executed by a hardware-based processing system is configurable to cause: implement of a machine learning model for implementing the random forest algorithm to process by the random forest application, one or more target stocks which correspond to a target stock related information based on stock indicators that include at least one of a simple moving average, a relative strength index, a moving average convergence divergence signal, an exponential weighted moving average, and a Bollinger band.

In yet another exemplary embodiment, a system including a hardware-based processor and memory, wherein the memory includes processor-executable instructions encoded on a non-transient processor-readable media is provided. The processor-executable instructions are configurable to be executed by the processor to perform a method including the steps of: executing an app in a course of stock trading to implement a software package connected to a cloud-based computing system; executing, via the app, a random forest application connected to a voice actuated software package in the cloud-based computing system by user voice actuation wherein the random forest application contains a machine learning model for implementing the random forest algorithm; receiving a set of stock data from multiple sources of stock data including brokerage accounts, content sources, and stock quote providers wherein the set of stock data at least includes stock prices at the open and close of a market, changes in stock prices during the open and close of a market, and real-time stock data; identifying a stock of interest contained in the set of stock data; defining a range in time of the set of stock data wherein the range in time includes: a set of stock data contained in a window defined of an initial selected month, a day or real-time period and an end of the selected month, day and real-time period; applying the random forest model to the set of stock data by creating multiple decision trees to predict a stock price in a quantified period, amount or percentage change in a stock price; presenting the predicted stock price in a graphic user interface; and providing alerts, messages or notifications on a display contained within the graphic user interface so that a user can trade on the stock in an anticipation of a predicted change in the stock price.

In an exemplary embodiment, the system further includes: training a prediction model based on supervised and unsupervised learning of the set of data wherein at least the supervised model uses data results that are within a range selected by a user; and training an estimation model based on supervised and unsupervised learning of the set of data wherein at least the supervised model uses data results that are within a range selected by the user.

This summary is provided to introduce a selection of concepts in a simplified form that is further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The exemplary embodiments will hereinafter be described in conjunction with the following drawing figures, wherein like numerals denote like elements, and wherein.

FIG. 20 is an exemplary chart of a screenshot of a graph of a sample portfolio results derived by the implementation of the random forest model application in accordance with various embodiments.

DETAILED DESCRIPTION

Figure 1:
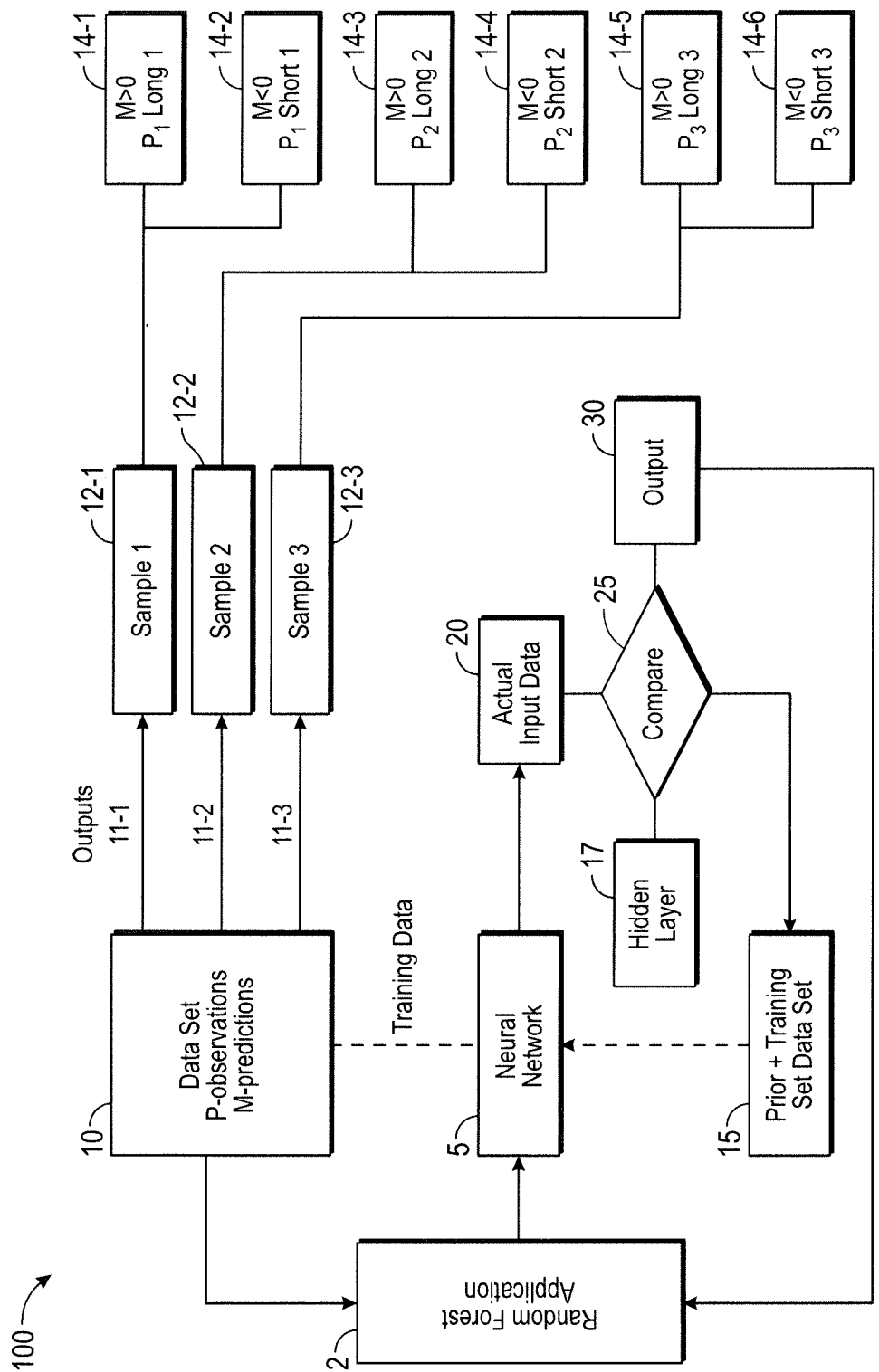
FIG. 1 is an exemplary diagram of the implementation of the random forest application and model for use in a neural network in accordance with various embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The prospect of investing is often fraught with anxiety equated to gambling by the general public. Even for the experts in finance, forecasting stock prices is both difficult and complex due to the volatility of the stock market. Trends in the stock market instances can be random fluctuations or recognized patterns that can be caused by investor sentiment or just plain uncertainties. With the market in a constant state of malaise, and often rapidly expanding, the need for a more advanced and precise technique is imperative.

Nevertheless, if stock changes are correctly predicted, profits can be reaped and the risk can be minimized. There are several ways of predicting stock market prices such as using ARIMA (Autoregressive Integrated Moving Average) modeling or ARCH (AutoRegressive Conditional Heteroskedasticity) modeling. However, using models such as ARIMA and ARCH requires extensive data from time series analysis and can be considered too restrictive. Essentially, the models create a more complicated process with too many parameters. By implementing machine learning techniques with neural networks, and more specifically machine learning utilizing a random forest algorithm forecasting of stock predictions can be performed efficiently.

The random forest algorithm is a supervised classification or regression algorithm that uses a multitude of decision trees to produce a prediction, thus creating a profitable algorithm that can accurately predict stock price movement.

The random forest algorithm works can be implemented to analyze past data to make future predictions based on its analysis. The random forest algorithm is extremely accurate because it prevents overfitting of data by using one of the following two different techniques. First, by using the mean square error (which reduces variance), or the algorithm finds the average of the data between a collection of decision trees and lowers the risk of high variance, thus preventing overfitting. Other advantages of the random forest algorithm include a high accuracy for large amounts of data when compared to just decision trees. The algorithm can also run extremely efficiently with large amounts of data and generate an unbiased prediction using analysis of that data.

Stocks can create an enormous amount of volatility, uncertainty, and extreme risk. By using a machine learning technique, such as random forests, stock changes can more accurately be predicted with far less risk involved within the trades. The random forest is an ensemble learning system for regression that is used by the construction of multiple decision trees. For example, by using an open-source platform such as QUANTOPIAN®, stocks can be sorted and converted into individual data frames, for price analysis and for a prediction based on past data using a multitude of decision trees found in the random forest model.

In various exemplary embodiments, the present disclosure provides methods and systems for implementing a machine learning for predicting stock movement, including receiving stock data from multiple sources of stock data wherein the stock data is stock prices at the open and close of a market, changes in stock prices during the open and close of a market, and minute to minute stock date; identifying a particular stock of interest of the stock data received; defining a range in time of the stock data received wherein the range includes stock data of a month, a day or in real-time; applying a random forest solution to a particular stock data to determine, estimate, and/or predict a stock price in the future, near future or at a next moment; presenting the estimated or predicted stock price in a graphic user interface; and providing alerts, messages or notifications on a display with the graphic user interface so that a user can trade on the stock in anticipation of future change in the stock price.

In various exemplary embodiments, the present disclosure provides methods and systems for performing stock analysis in a portfolio, with a graphic user interface configured in estimation and supervising learning application using machine learning techniques on a computing device by selecting companies based on their industry/sector and prominent index; selecting companies diversified companies; creating a multitude of decision trees; choosing an amount of prior bars related to intraday-movement of stocks; choosing a number of days for the stock selection history; determining a scale of the dataset from the stocks; defining a classification system or a régression system for the select stocks; constructing a model for estimating stock prices based on random forest solutions; creating a set of defined parameters or indicators including at least: RSI and MACD; determining by user input, a number for decision trees for the estimation model; and creating a prediction and estimation model based on supervised and unsupervised training including testing at least the supervised model using data until results are within a range desired each of the models.

In the various exemplary embodiment, the implementation of the Random Forest model in a trained neural network. The reduced to practice regression model illustrated empirical results that made over 138% in the course of a year, beating the S&P 500 benchmark by over 80%. The results showed that a substantial profit was made while the risk was extremely low within the course of the term. The results also indicated a strong correlation between the stock chart and the predictor.

FIG. 1 is an exemplary diagram of the implementation of the random forest application and model for use in a neural network in accordance with various embodiments. In FIG. 1. Diagram 100 illustrates the relation of the outputs for a data set containing observation data of changes in a stock price and prediction data of changes in the stock price.

For example, on receiving the inputs of a data set 10 of observation data from a user device, as well as the output 30 from the processing models of the neural network 5 of the actual input data 20, the prior training set data 15 configured in a hidden layer 17; this is compared by processing unit 25 with the actual input data to process the one or more target stocks to create an analytical model, wherein the analytical model includes individual decision tree at the random forest application 2. for each of the one or more target stocks. In an embodiment, the processing unit 25 is configured to sort each of the one or more target stocks and in turn, are converted at the random forest application 2 into nodes of the respective decision tree.

Further, the random forest application 2 contains a decision tree that constitutes the basic building blocks of an analytical model, wherein the analytical model is the random forest model. Further, the decision trees use binary split nodes each time certain criteria are met and the decision is made either for going long or short.

In an exemplary embodiment, the random forest model includes four exemplary decision trees (Tree 1, Tree 2, Tree 3 and Tree 4), wherein each of the decision trees has a class. For example, Tree 1 has class A, Tree 2 has class B, Tree 3 has class C, and Tree 4 has class D. Further, in the random forest technique/model, a final class is being determined based on a majority of classes.

In an embodiment, the processing unit 25 is configured to calculate the mean square error for the corresponding target stock related information in accordance with the following equation to prevent the overfitting of data/information:

$$MSE = \frac{1}{n}\sum_{i=1}^{n}(Y_i - \hat{Y}_i)^2.$$

where n is the number of instances,

Y is a label of the instance, and

I=1.

Similarly, the processing unit 25 is configured to calculate the probability density function for the corresponding target stock related information in accordance with the following equation to interpret randomness in an array of target stock related information:

$$p(y \mid v) = \frac{1}{T}\sum_{t}^{T} p_t(y \mid v)$$

where,

Y is a label of the instance, and

T is the number of decision trees decided by the amount of data available.

Further, the processing unit 25 is configured to deduce co-relation between the stock prices and stock movement (i.e. the target stock related information) of each of the decision trees for each of the one or more target stock based on the mean square error and the probability density function.

Furthermore, in another embodiment, the processing unit 25 is configured to process the one or more target stocks and the corresponding target stock related information based on stock indicators including at least one of a simple moving average, a relative strength index, a moving average convergence divergence signal, an exponential weighted moving average, and a Bollinger band.

Thereafter, the processing unit is configured to process the analytical model and predict future stock parameters, wherein the future stock parameters include future stock prices and future stock movements of each of the one or more target stocks. In an embodiment, the processing unit 25 is configured to define classification and a regression system.

Furthermore, the present invention encompasses storing the stock related information of each of the plurality of available stocks, and future stock parameters of each of the one or more target stocks. Also, the present invention encompasses updating the stock related information of each of the plurality of available stocks, and future stock parameters of each of the one or more target stocks whenever there is a change. Likewise, the present invention encompasses transmitting alerts, messages or notifications to the user device [110] whenever there is a change in the stock related information of one or more target stocks.

As an exemplary example of a data, the terms $P_{observations}$ and $M_{predictions}$ connote the data for the data that can be used to train the neural network 5. Each prior training previous data set 15 for the neural network using random forest technique figure to the actual inputs for the hidden layers 17 in the neural network. The sample sizes are segregated into two hidden layers one denoting for stock change predictions for going long and another hidden layer denoting for stock predictions for going short. The hidden layers would have a total of 3150 nodes however illustrated in the diagram are only three nodes. Each node is already activated based upon the aggregation that was previously performed in a prior cycle. In addition, each node of the 3150 nodes is weighted by an appropriate weighting factor. To determine the weighting factor of each node is based on the range of the nodes and the bias applied to each node. In an exemplary example, a set of weighting factors can be categorized from 1 to 10 and will be each computed by a solution that uses the weighted sum of each with a number of activated inputs. The number of activated inputs can be configured in a range by adding a negative 10 bias and a positive 10 bias. This enables all of the inputs which are selected to be within a reasonable range [and prevents seismic drawdowns in the market]). Once, all of the variables are then plugged into a sigmoid function which will compress the inputs into a lesser range as an example of the range of 1-10. In the actual model, there will be a total of 31050 weights+315 biases. Using the weighted sum, the random forest application 2 can deter mine the weighted matrix and vectors and which can be stored as testing data within the neural network 5.

The data set 10 is for a particular asset that looks back on 7 days and only considers 700-day history. It is generated every week and stock prices are recorded every minute starting at the opening of the market and records till the close of the market. It contains outputs 11-1, 11-2, 11-N, and samples 1 . . . N (12-1 . . . N). Each sample is further divided into sets of M>0 and $P_1$ long 1, (14-1) and M<0 and $P_1$ short 1, (14-2), etc.

Figure 2:
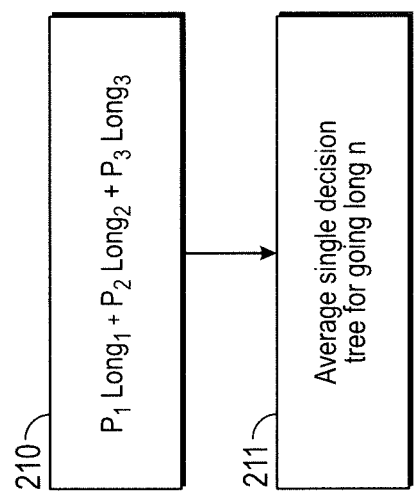
FIG. 2 is an exemplary diagram of summations of the prediction data in accordance with various embodiments.

FIG. 2 is an exemplary diagram of the summations of the prediction data in accordance with various embodiments. In FIG. 2, the prediction data is summed in each subset to create an average decision tree for going long. FIG. 2 illustrates in block 210 the computing by summing of the predicted long stock prices in a set of 1 to N predictions. In block 211, the average single decision tree of a random forest application is created for the long predictions where each branch of the tree is designated as $P_n$ $long_n$ with a set of n branches. The average decision tree created is $P_n$ $long_n/N = P_{ave}$ $long_{ave}$.

Figure 3:
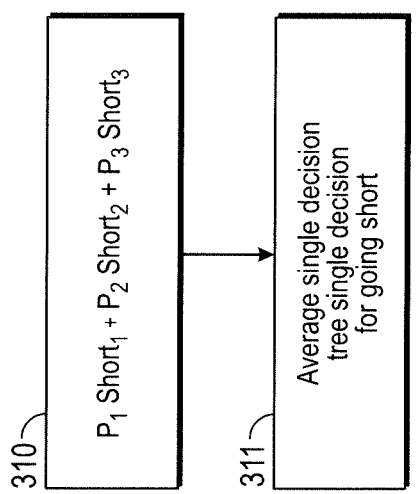
FIG. 3 is an exemplary diagram of summations of the prediction data in accordance with various embodiments.
Figure 4:
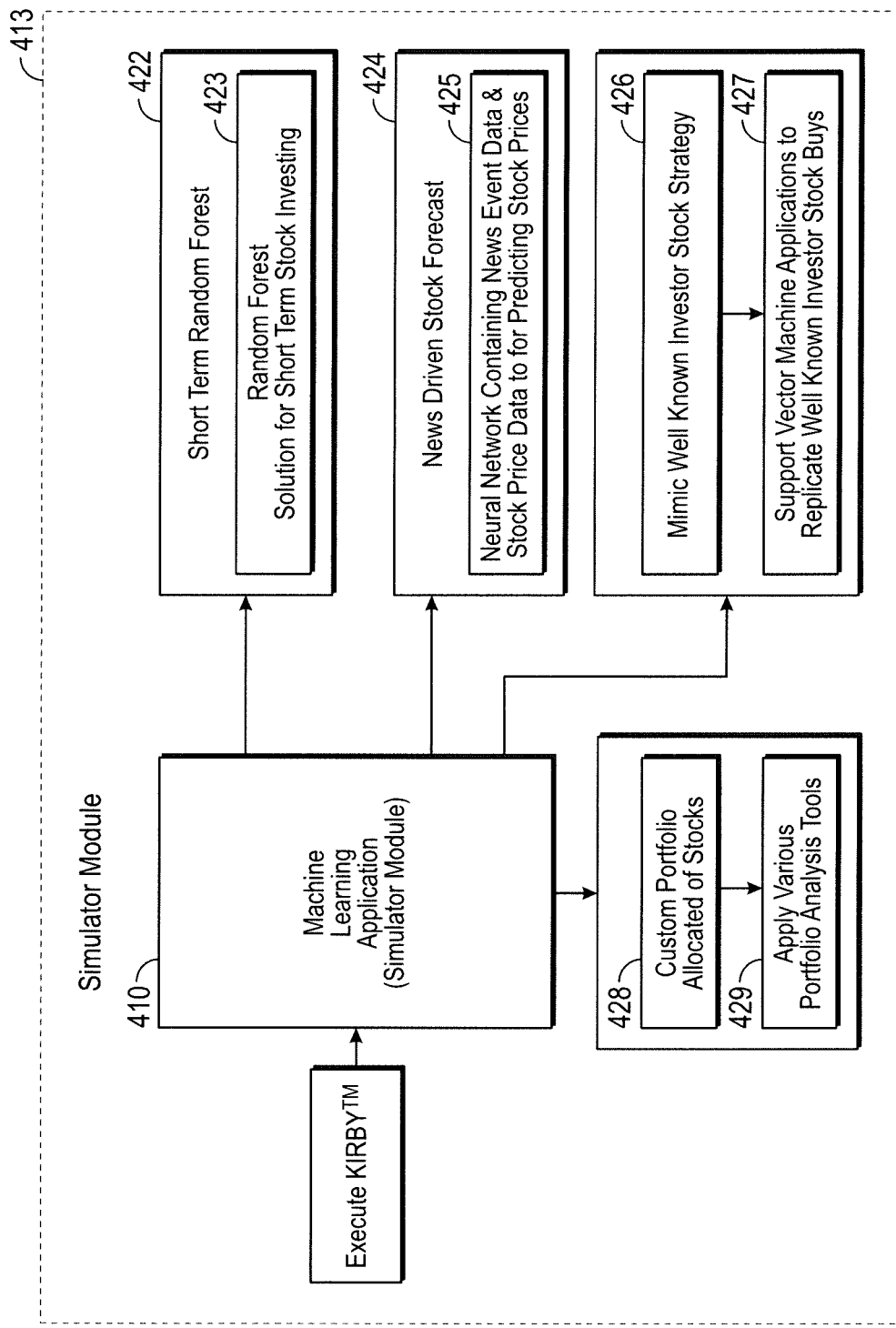
FIG. 4 is a is an exemplary diagram of a simulation of an implementation of the random forest application in accordance with various embodiments.
Figure 10:
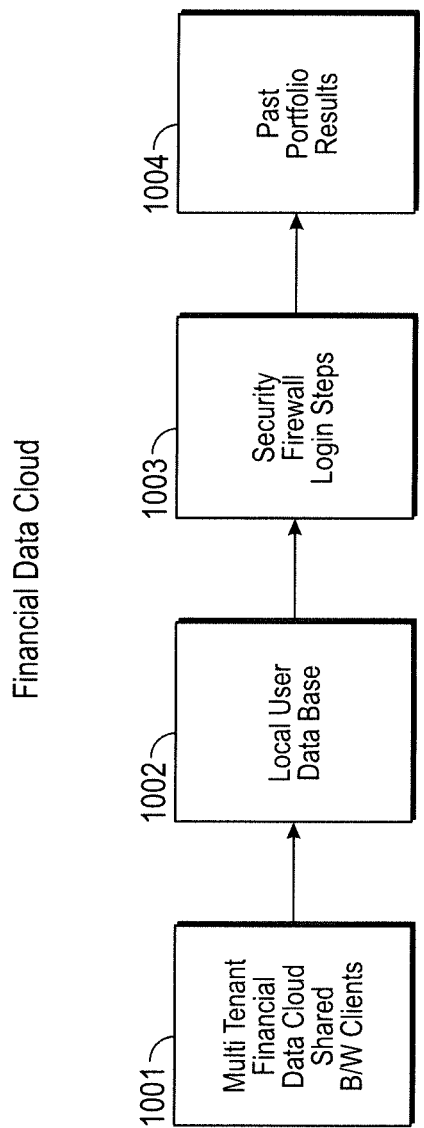
FIG. 10 is an exemplary diagram on implementation of use in the financial cloud system of the random forest application in accordance with an embodiment.

FIG. 3 is an exemplary diagram of summations of the prediction data in accordance with various embodiments. In FIG. 3, the prediction data is summed in each subset to create an average decision tree for going short. FIG. 3 illustrates in block 310 the computing by summing of the predicted short stock prices in a set of 1 to N predictions. In block 311, the average single decision tree of a random forest application is created for the short predictions where each branch of the tree is designated as $P_n$ $short_n$ with a set of n branches. The average decision tree created is $P_n$ $short_n/N = P_{ave}$ $short_{ave}$ FIG. 4 is an exemplary diagram of the simulation model implementation of the random forest application in accordance with various embodiments. This block diagram illustrates the Machine Learning Application in block 421, which entails 3 selection choices for picking a strategy. The Machine Learning Application is activated by the name KIRBY™ and executed by the name KIRBY™ (in the case that an ALEXA® or other voice recognition service is used and implemented to trigger the random forest application). Block 422, is configured with a random forest tree structure to implement at block 423 a short term strategy. That is the short term investing includes using the random forest machine learning ML technique. This strategy first takes in the account information(KIRBY™ is linked to ETRADE®, INTERACTIVE BROKERS®, FIDELITY®, ROBINHOOD®, and/or SCOTTRADE® depending on the accounts that the user wants to be linked) and organizes information as a tensor(Information organization is depicted in FIG. 10) which contains three particularly different arrays (array 1: Account information, array 2: Capital, array 3: Assets in which the ML technique will trade) Once the information is contained, KIRBY™ will create a portfolio which will include the stocks chosen(using a stock screener based on User's needs from Finviz) and look back on data from 7 days within 700 days of recorded information. The portfolio will then create a new model every week which has the python function of (create model, date_rules.week_end( ), time_rules.market_close(minutes=20)). The portfolio will then begin trading by using the python schedule_function(trade, date_rules.every_day( ), time_rules.market_open (minutes=90)). This will then begin the trading of stocks when activated by the consent of KIRBY™ RANDOM FOREST. The portfolio will include features of 'RSI','EMA','MACD','SMA_5','SMA_10','bb_lower', 'bb_middle','bb_upper'. The tensorial data from KIRBY will then be decomposed by using tucker decomposition and then further decomposed by other tensorial means into individual i and j vectors. The I and J vectors then can be transformed into non-stationary data(data that can not be predicted/forecasted or can not be interpreted unless there is a tool or technique to do so) The portfolio will then be traded and created every single day and will use a Random Forest Regressor solution which will take in 100 trees at a maximum depth of 20 nodes which will include the new tensorial data and once invested in the stocks, will make a prediction either to go long or short. Going long will take 4× more capital than going short and a prediction will be sent to KIRBY which will then be sent to a user. The duration of the short-term trading strategy will be 2 years.

Block 424 is an interface configured for receiving news data for augmenting the training set of data in the neural network in block 425: this strategy is for news-driven investing which utilizes the financial data and the cloud by using the Neural Network ML technique. This strategy presents an ensemble long-short term (LSTM) neural networks for stock predictions using technical analysis and valuation ratios. An ensemble network can be defined as the machine learning that is implemented to train more one network on the same dataset of training data.

Using training data from a set of valuation data from the NYSE Trade-and-Quote (TAQ) database and from WRDS (Wharton Research Data Service) the trades can be conducted from 9:30 am to 4:00 pm every working business day. Using a Recurrent Neural Network on non-stationary data(data that is unpredictable and cannot be model and/or forecasted thus having no relationship), they have the ability to use past observations by perpetuating the same cell state c which will be updated every time step t. The mathematical function illustrated below displays the equation (U and W are weight matrices while $b_c$, $b_o$ are the bias vectors:

$$c^{(t)} = f(Ux^{(t)} + Wc^{(t-1)} + b_c), h^{(t)} = \phi(Vc^{(t)} + b_o)$$

With the implementation of the recurrent neural networks, it is necessary that every time the portfolio is processed with a different set of data such as observations (i.e. news data) during the training process, the training process degrades as all the data is treated equally and the initial subset of the training data is decreased as a percentage of the overall training data set. This, in turn, results in the overall training set of data becoming weaker and weaker to the point the additional observed data fails to have any effect on the training set and fails to differentiate the main derivative components of data presented in the financial disclosures for the target stock. To resolve this issue, it is necessary to use an LSTM ensemble network, the LSTM ensemble networks are able to be connected to each node of the random forest application in a linear manner that ensures a sufficient communication of stock data information without saturating the data already contained in the data set and distorting the portfolio. In an exemplary embodiment, the LSTM recurrent neural network is an ensemble learning that retains values over random intervals. LSTM recurrent neural network is also capable of classifying and predicting time series data within unknown time intervals. An LSTM has three specific gates: Input Gate, Forget Gate, and an Output Gate. The LSTM gates are sigmoid activation functions and either produce a 0 or a 1. 0 means the gates are blocking (0) while 1 means the gates are opening. The LSTM is represented in a sigmoid function because the values are meant to be positive.

The input gate tells us what new information is stored in the cell state. The forget gate tells us which information is superfluous within the cell state. The output gate activates the final output of the 1stm block at time t.

The LSTM works by calculating the mean and standard deviation of the inputs in the time dimension and then normalizing the data. The LSTM has the ability to store, forget, and read information using three types of gates. In the forget gate, the cell retains some of the data from the $f_t$ and then adds new to the $i_t$ gate(input gate). The process is then updated into the main long-term cell state which is finally updated through tanh(·) and filtered through the $o_f$ and generated through y^t which is then sent to the short term gate of $h_t$. $\otimes$ is an element-wise multiplication operation, $\sigma(\cdot)$ is a logistic function and tanh(·) is the hyperbolic tangential function. The gates are therefore connected to the ensemble neurons and are activated within the sigmoid function. When the data from the model predicts to go long based on the softmax layer of the ensemble network, capital will be used to proceed going long, else if the news is neutral, securities will not be traded else will be shorted.

$$i_t = \sigma(W_{xi}^T x_t + h_{hi}^T \cdot h_{t-1} + b_i)$$

$$f_t = \sigma(W_{xf}^T x_t + W_{hf}^T \cdot h_{t-1} + b_f)$$

$$o_t = \sigma(W_{xo}^T x_t + W_{ho}^T \cdot h_{t-1} + b_o)$$

$$g_t = \tanh(W_{xg}^T x_t + W_{hg}^T \cdot h_{t-1} + b_g)$$

$$c_t = f_t \otimes c_{t-1} + i_t \otimes g_t$$

$$\check{y}_t = h_t = o_t \otimes \tanh(c_t)$$

$i_t \rightarrow$ represents input gate.
$f_t \rightarrow$ represents forget gate.
$o_t \rightarrow$ represents output gate
$\sigma \rightarrow$ represents sigmoid function.
$w_x \rightarrow$ weight for the respective gate(x) neurons.
$h_{t-1} \rightarrow$ output of the previous 1stm block(at timestamp t-1).
$c_t \rightarrow$ input at current timestamp.
$b_x \rightarrow$ biases for the respective gates(x).

Block 426 is an interface to mimic investor style or stock positions from historical data and disclosures. Block 427 uses a support vector machine to predict future prices of a dataset of using techniques of well-known investors (e.g. Warren Buffet, James Harris Simons statistical arbitrage) and has ML solutions which picks stocks based on valuation as apart as a Chicagoan investor who will pick stocks based on volatility and frequency which utilizes past financial data metrics provided by ETRADE® and NASDAQ®, and the cloud by using the Support Vector Machine ML technique. Support Vector Machines can be used to trade on based on trends such as a volatility spike or a strong momentum for individual stocks. Support Vector Machines is a binary classifier which creates a decision boundary in which some of the prices fall marginally on one side of the boundary while most of them fall on the other side of the boundary, this can occur through cross-validation of stocks. A linear boundary or hyperplane can be described as:

$$\beta 0 + \beta 1 X1 + \ldots + \beta n Xn = \beta 0 + \Sigma \beta i Xi = 0$$

The inner products of the hyperplane can be rewritten as support vectors and the entire hyperplane is then transformed into a Support Vector Classifier (SVC). Within the SVC's the data can be collected from the WRDS and YAHOO!® Finance. A kernel takes the data and transforms into the form deem necessary. A Gaussian Radial basis kernel is a kernel that is used when there is no prior information about the data. The SVM model uses a radial kernel function and can be defined as:

$$K(x_i, x_k) = \exp\left(-\frac{1}{\delta^2} \sum_{j=1}^{n} (x_{ij} - x_{kj})^2\right)$$

δ is the bandwidth(free parameter which has a strong influence on the model) of the kernel. This function means that it can handle datasets that have no correlation or relationships as the bandwidth functions have Euclidean geometrical properties that make this possible. This function can be used to predict trends into the stocks based on Euclidean distance and train the dataset. The portfolio can be run for about 4 years or at the discretion of the user The custom block 428 and portfolio block 429 implement a custom process of the 3 selections by using either a combination of the following four strategies (example: half the capital for using selection 2 and the other half for using selection 1) This can be activated and executed by name KIRBY™ CUSTOM.

Figure 5:
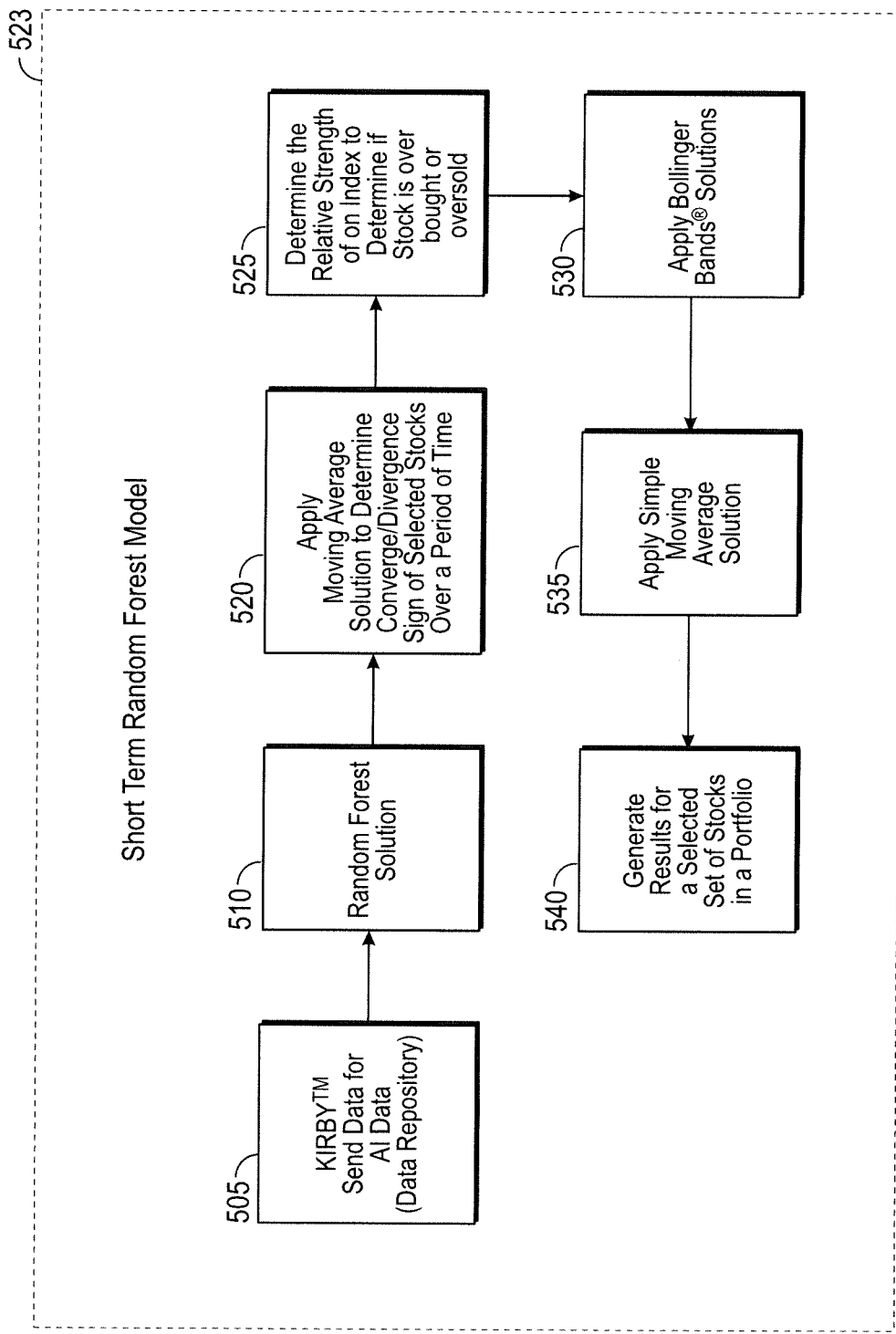
FIG. 5 is an exemplary diagram of a short term application of the random forest application with Bollinger bands in accordance with an embodiment.

FIG. 5 is an exemplary diagram of a short-term application of the random forest application with Bollinger bands, Moving Average Convergence Divergence, Relative Strength Index and Simple Moving Average in accordance with an embodiment. The Short Term (Random Forest) Module 523 In FIG. 5, a configured data repository (i.e. the KIRBY data repository) at 505 sends a data set of stock data over a particular period to train the random forest solution 510. The random forest solution 510 processes the dataset and outputs a moving average at 520 that illustrates a converge or divergence derived from the dataset. The relative strength of an index 525 is then compared with Bollinger bands (two standard deviations (positively and negatively) away from a simple moving average (SMA) of the security's price) to forecast the potential high and low prices for a market relative to the moving average at 530. Here is this Bollinger Band® formula(REMEMBER INCLUDE RSI Formula, MACD, SMA):

$$MACD = 12 - \text{Period } EMA - 26 - \text{Period } EMA$$

$$RSI = 100 - \left[\frac{100}{1 + \left(\frac{\text{Average Profit of Asset}}{\text{Average Loss of Asset}}\right)}\right]$$

$$BOLU = MA(TP, n) + m * \sigma[TP, n]$$

$$BOLD = MA(TP, n) - m * \sigma[TP, n]$$

where:
BOLU=Upper Bollinger Band
BOLD=Lower Bollinger Band
MA=Moving average
TP (typical price)=(High+Low+Close)÷3
n=Number of days in smoothing period (typically 20)
m=Number of standard deviations (typically 2)
σ[TP,n]=Standard Deviation over last n periods of TP The squeeze is the central concept of Bollinger Bands®. When the bands come close together, constricting the moving average, it is called a squeeze i.e the convergence or the divergence. A squeeze signals a period of low volatility and is considered by traders to be a potential sign of future increased volatility and possible trading opportunities. Conversely, the wider apart the bands move, the more likely the chance of a decrease in volatility and the greater the possibility of exiting a trade. However, these conditions are not trading signals. The bands give no indication when the change may take place or which direction price could move.

The average profit or loss of an asset can be calculated during the look-back period, which is typically 14 periods of a stock. The RSI can determine the bullish or bearish market signals in the stock, for example, if stocks appear over the 50% mark in the RSI, this suggests that the asset is bearish. Conversely, if the stock appears just over the 30% marking, this suggests a bullish signal.

Moving Average Convergence Divergence is essentially a trading indicator to determine the strength, direction, momentum, and duration of a stock price. MACD has a 12 day shorter moving average which is responsible for MACD's volatile movements and 26 days longer moving average is a reactant to the stock's price oscillation. The signal line determines the crossover in MACD signals because the signal is a 9 day EMA, it can be used to determine if a stock is to go long or short. If a stock appears to be under the crossover line of the EMA lines and is in the negative territory, this demonstrates a bearish trend, conversely, if the stock appears to be in the positive territory and is approaching the crossover line this indicates a bullish signal.

Breakouts-Approximately 90% of price action occurs between the two bands. Any breakout above or below the bands is a major event. The breakout is not a trading signal. The mistake most people make is believing that that price hitting or exceeding one of the bands is a signal to buy or sell. Breakouts provide no clue as to the direction and extent of future price movement.

Figure 6:
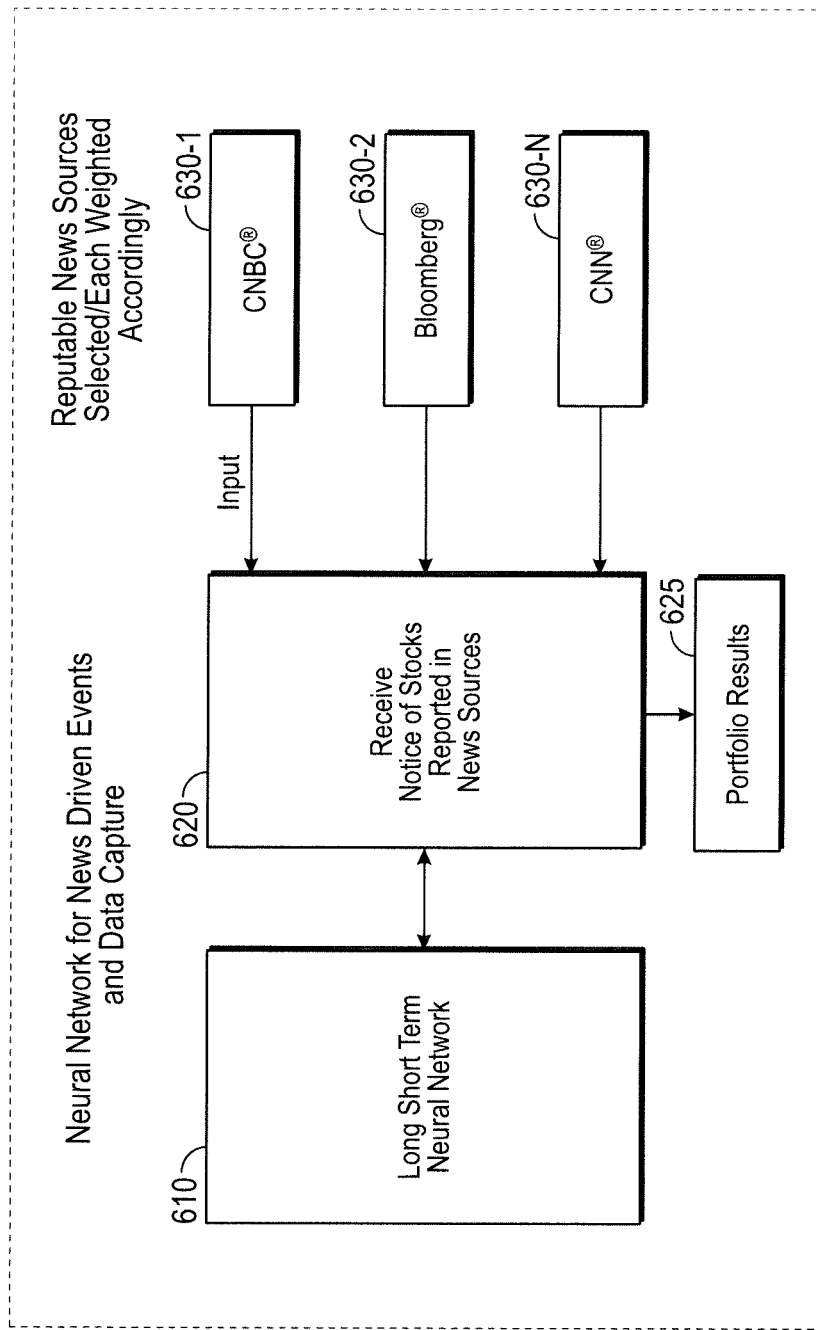
FIG. 6 is an exemplary diagram of a configured neural network with augmented news data for supervised learning training for use with the random forest application in accordance with an embodiment.

FIG. 6 is an exemplary diagram of a configured neural network with augmented news data for supervised learning training for use with the random forest application in accordance with an embodiment. The news-driven data is configured in a news neural network 625 that includes a neural network 610 created by a Bayesian node structure, of stock data 620 aggregated from a variety of sources such as CNBC® 630-1, BLOOMBERG® 630-2, and CNN® 630-

N. The neural network 610 generates the portfolio result in data 625 after processing by the random forest algorithm.

Figure 7:
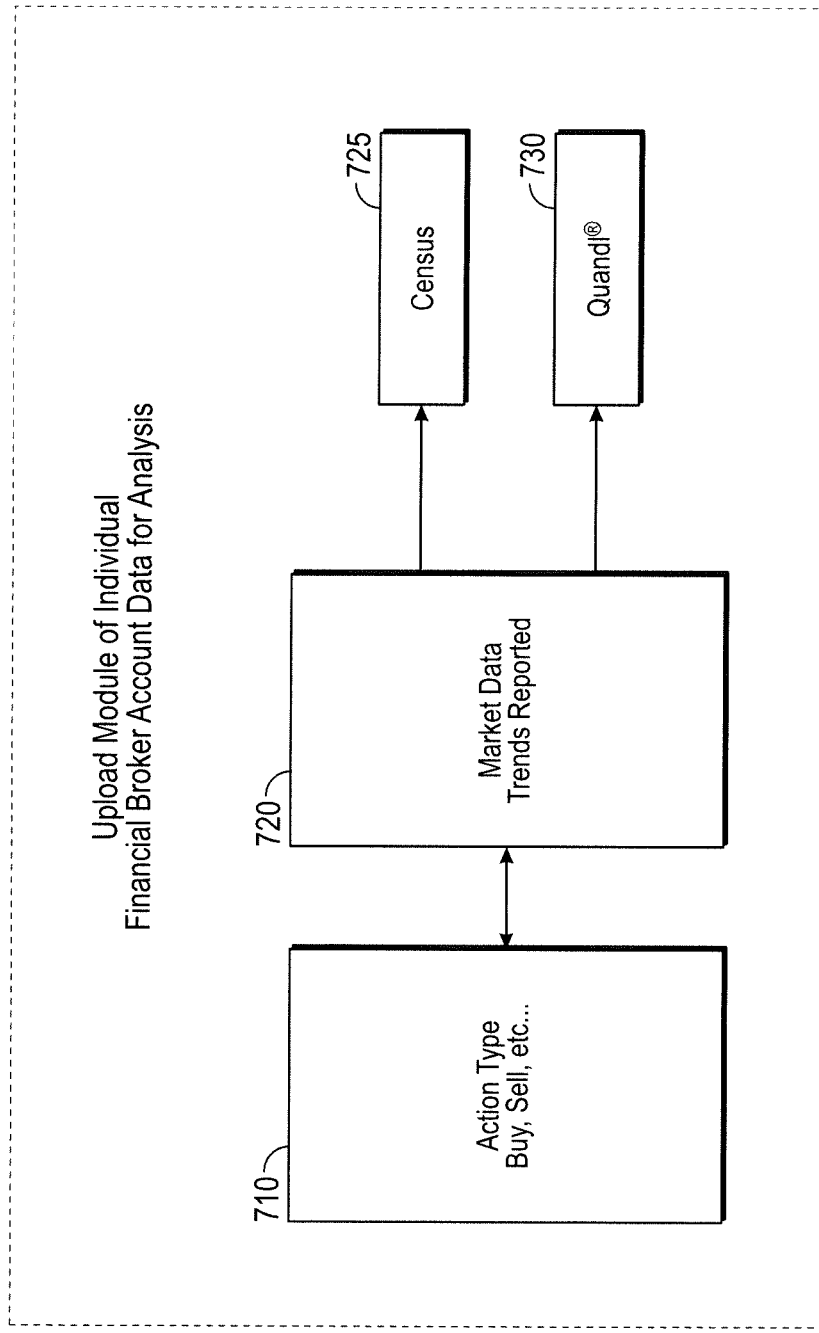
FIG. 7 is an exemplary diagram of action executions with updates of financial data for use in the neural network data set and for implementation of the random forest application in accordance with an embodiment.

FIG. 7 is an exemplary diagram of action executions with updates of financial data for use in the neural network data set and for implementation of the random forest application in accordance with an embodiment.

The financial data uses a selection of action type 710 for updates about news events, economic data trends 720 based on sources from Census 725, and QUANDL® 730. These sources can be configured as desired by the user.

Figure 8:
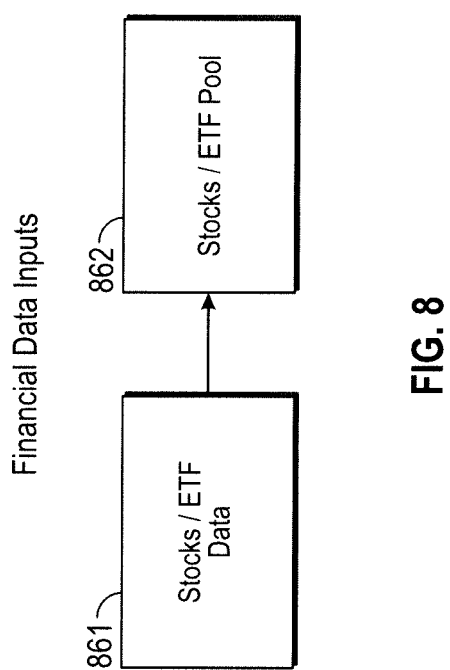
FIG. 8 is an exemplary diagram of action executions with updates of financial data of stocks and ETFs for use in the neural network data set and for implementation of the random forest application in accordance with an embodiment.

FIG. 8 is an exemplary diagram of action executions with updates of financial data of stocks and ETFs for use in the neural network data set and for implementation of the random forest application in accordance with an embodiment. In this case, the financial data includes stocks/ETF data 861 and Stocks/EFT pooled data 862.

Figure 9:
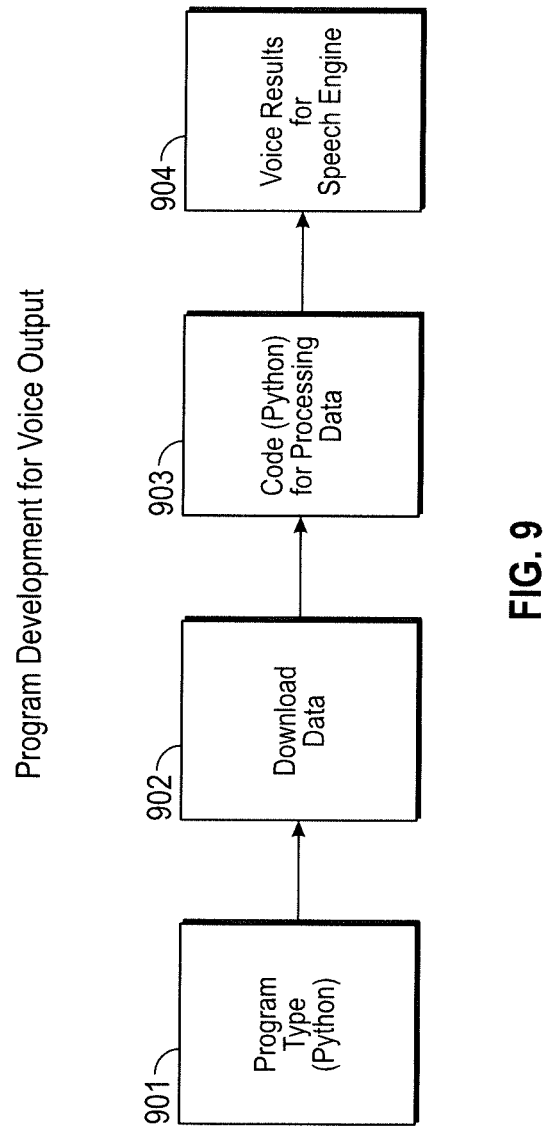
FIG. 9 is an exemplary diagram of the component parts for a developed package for the random forest application in accordance with an embodiment.

FIG. 9 is an exemplary diagram of the parts for a developed package for the random forest application in accordance with an embodiment. The developed package includes program type "Python" 901, downloading the data 902, code for processing the data 903 and voice results generated 904.

Materials

Each of the above parts was hosted and developed on Computer device with processing and networking capability. In the present configuration, an APPLE® MacBook pro or the like was used with 2.6 GHz 6-core 9th-generation INTEL® Core i7 processor, Turbo Boost up to 4.5 GHz, AMD Radeon Pro 5300M with 4 GB of GDDR6 memory, 16 GB 2666 MHz DDR4 memory, 512 GB SSD storage, 16-inch Retina display.

The code was developed using a Python Package or Quantopian.com (open-source that combines python)

Variables

The independent variable (X) is the past stock prices, while the dependent variable (Y) is the future price based on the random forest machine learning technique.

Procedure

To Create a System of Stocks:

1a. Perform extensive research on all interested companies of choice.

1b. Select companies based on their industry/sector and prominent index. 1c. Choose 10-12 diversified companies.

To Create a Multitude of Decision Trees:

2a. Choose the number of prior bars (intraday-movement of stocks).

2b. Choose the number of days for the stock selection history.

2c. Decide the scale of the dataset from the stocks.

2d. Define a classification system or a regression system.

To Construct the Model:

3a. Create a set of defined parameters or indicators (RSI, MACD, etc.).

3b. Then decide how many decision trees you want.

3c. Then create a prediction and train your model.

3d. Backtest until you get the desired result.

Equations $$p(y \mid v) = \frac{1}{T}\sum_{t}^{T} p_t(y \mid v)$$

When using random forest algorithms, the amount of data received from the datasets (stock market prices), is extremely high and can lead to fatal errors in the algorithm if not properly addressed. To prevent this from occurring in random forest regressions, the algorithm calculates a variance reduction using the mean square error. The MSE here is defined as the Mean Square Error. Where n is the number of instances, Y is the label of the instance, and I=1. This equation was used to prevent the overfitting of data by reducing the extraneous stock data in order for the random forest to make more accurate predictions.

$$p(y \mid v) = \frac{1}{T}\sum_{t}^{T} p_t(y \mid v)$$

In random forest regression, decision trees are equal to the average of all individual trees. Where p(yIv) is probability density function, which is used to interpret randomness in a data array, matrix or set. The probability density function basically defines a probability distribution for a continuous random variable. Lastly, T=trees.

This equation was used to interpret daily data, and its exact timing depended upon the parameters built into the trading functions (such as the time the market opens and the time the market closes).

FIG. 10 is an exemplary diagram on the implementation of use in the financial cloud system of the random forest application in accordance with an embodiment. The financial cloud is configured to provide financial stock information to the user, it can be configured in a multi-tenant database structure and shared between the users. The financial cloud includes a multi-tenant data cloud 1001, a local user database 1001, security firewall 1003 and past portfolio data database 1004, various implementation of the financial cloud can be configured in the machine learning server 1640 of FIG. 16 as desired.

Figure 11:
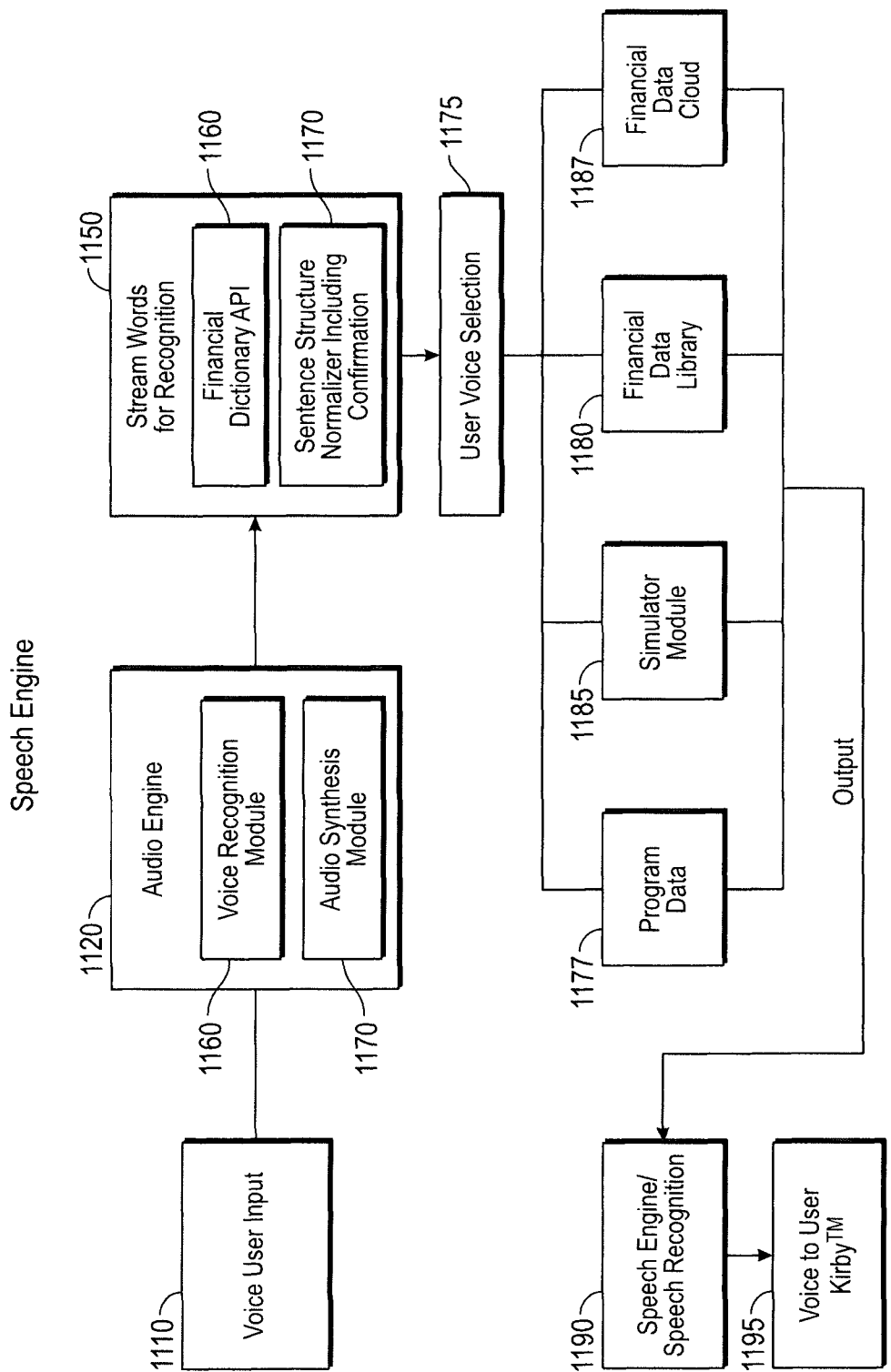
FIG. 11 is an exemplary diagram of a speech and audio implementation of the random forest application in accordance with various embodiments.

FIG. 11 is an exemplary diagram of a speech and audio implementation of the random forest application in accordance with various embodiments. This block diagram illustrates "KIRBY's Architecture" (or ecosystem) of the speech and audio engine. The first block depicted is illustrated block 1110 which takes in the user input and is recorded through the Audio Engine. Once the wordage is recorded in block 1120, the audio engine will recognize the verbiage 1130 and take in only the important words 1140 related to the command needed for example KIRBY: "How much income do you earn in a year", User: "I make $100,000 in salary, however, doesn't include earnings from law settlement or earnings from a lottery which equates to $120,000. KIRBY audio engine will then remove the superfluous verbiage and take in the particular answer as it is able to do this because of NLP (Natural Language Processing, FIG. 13). The next block 1150 depicts the Stream Word Inquiry which is the KIRBY built-in language response system. It contains a dictionary API (block 1160) and a sentence structure normalizer (block 1170). Block 1175 depicts the selection mode of the diagram. This includes block 1175 which includes simulator mode 1185, financial data library 1180 (includes sources of data to be transparent to the user), financial data cloud 1187 (stores all information in the KIRBY ecosystem) and program data 1177 (this includes the cache and security of the KIRBY system). The speech engine then can synthesize the data needed to give a response depicted in block 1190. Block 1195 is the Speech Output which is the response itself to the user.

Figure 12:
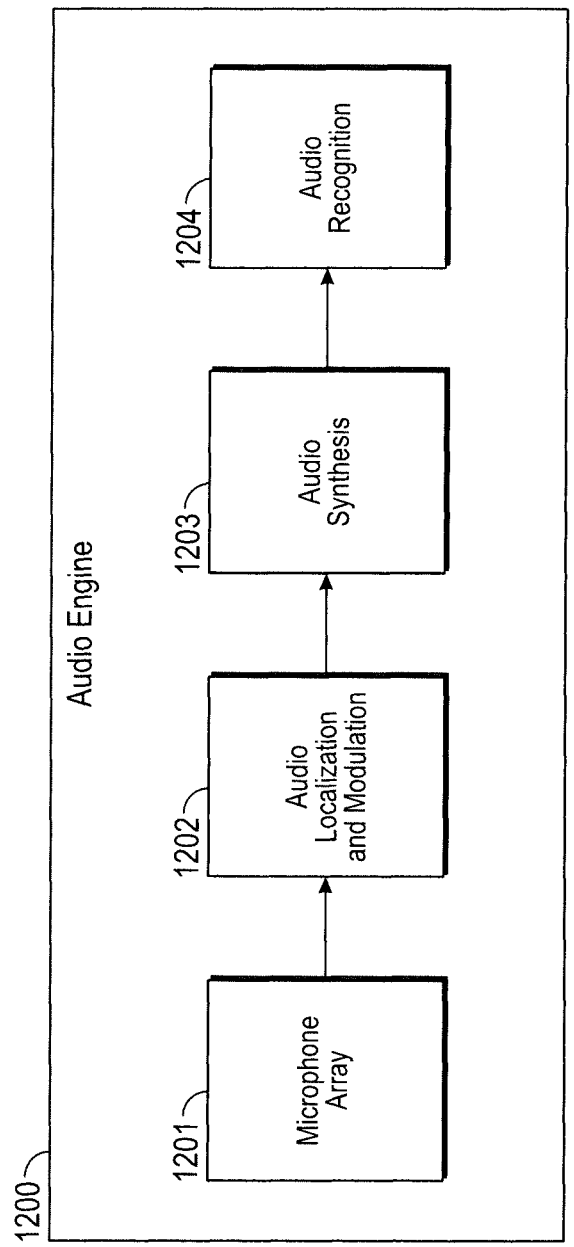
FIG. 12 is an exemplary diagram of a speech and audio implementation of the random forest application in accordance with various embodiments.

FIG. 12 is an exemplary diagram of a speech and audio implementation of the random forest application in accordance with various embodiments. In audio engine 1200 that can be configured locally with the client devices and includes a microphone array 1201, an audio localization and modulation module 102, an audio synthesis module 1203 and an audio recognition module 1204.

Figure 13:
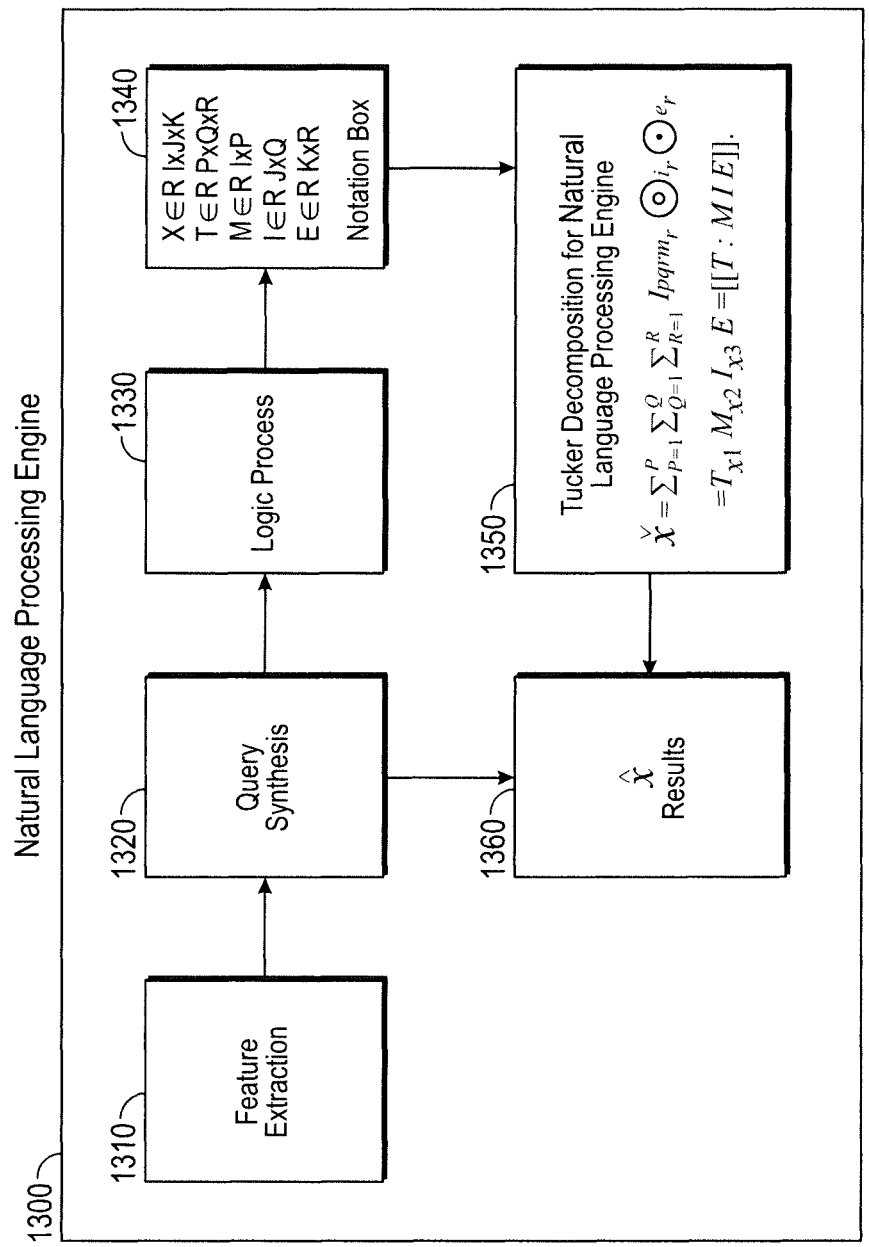
FIG. 13 is an exemplary diagram of a speech and audio implementation of the random forest application in accordance with various embodiments.

FIG. 13 is an exemplary diagram of natural language processing implementation of the random forest application in accordance with various embodiments. FIG. 13 includes in block 1310 feature extraction modeled for NLP processing engine 1300 is performed by the input of the data by tokenizing the information, and then converting the strings as a 3rd ranked tensor (income, investment goals(length of investing), expenses)[T; MIE]. In the block, 1320 query analysis is performed where the data is parsed and separated into individual third-ranked tensors by various logical processes 1330 which can enable the data then to be converted into matrix size forms of lexicon strings 1340 and financial array objects. The Tucker Decomposition 1350 can be expressed as: $\check{x} = \Sigma_{P=1}^{P} \Sigma_{Q=1}^{Q} \Sigma_{R=1}^{R} \text{Ipqrm}_r \odot i_r \odot e_r = T_{x1} M_{x2} I_{x3} E = [[T; MIE]]$. The NLP processing engine 1300 can thereby send information to the simulator mode, which can transfer the information for the proper strategy.

In an exemplary embodiment of a speech and audio implementation of the random forest application in the NLP processing engine 1300 of FIG. 13, further characteristics of the speech engine of feature extraction in block 1310 can be modeled for financial services, phonetic vowel synthesis, dictionary processor of financial terms, acoustic modeling for different accents, language modeling for enabling trading in voice requests from the client devices in different languages, and messages sent in a variety of languages.

Figure 14:
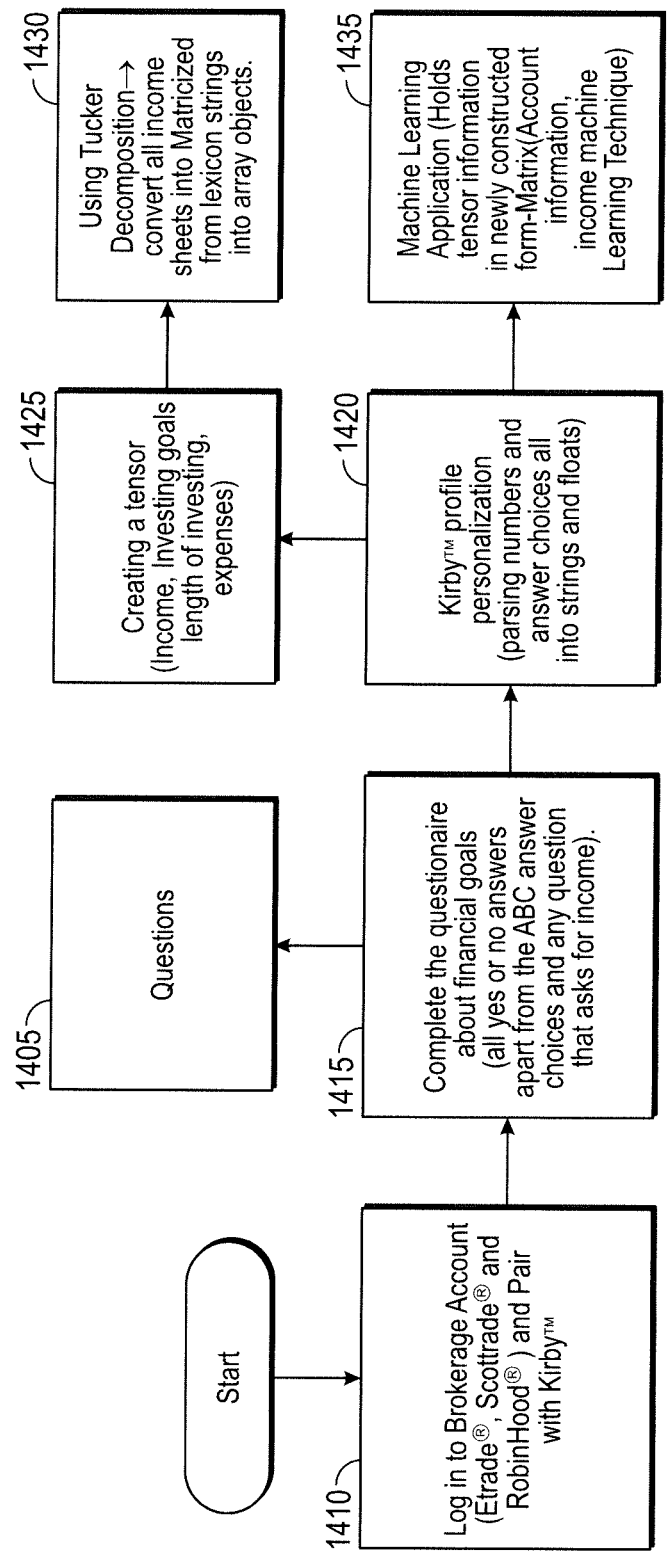
FIG. 14 is an exemplary flow diagram of the process for entering user profile information with various brokerage accounts to create investment goals based on tensor configurations and to use tucker decomposition algorithms in accordance with various embodiments.

FIG. 14 is an exemplary flow diagram of the process for entering user profile information with various brokerage accounts to create investment goals based on tensor configurations and to use tucker decomposition algorithms in accordance with various embodiments. In FIG. 14, initially a user would log into a brokerage account online using the REBUS voice-activated NLP tools at 1410, then a questionnaire at 1415 would be presented to the user; some of the information may include suggestions or automated completion steps, alternately the user profile may be determined by past trading data and positions in the connected brokerage account. Block 1405 includes a list of questions or goals for the user such as what is the users expected fiscal goals, how much does the user need for retirement, does the user foresee unusually high expenses etc. Next, at 1420, the AI NLP module (i.e. KIRBY™) would generate a profile for the user i.e. KIRBY™ user profile where the data would be parsed and answer choices placed in strings and floats for further processing. Next, at 1415 a tensor is created for income investment goals, length of investing and expenses. Next, at 1430, a tucker decomposition is implemented to convert all the income sheets into matricide form formed lexicon strings in array objects. Also, in 1425, the KIRBY™ machine learning application holds the tensor information in the newly constructed form with a matrix of account information, income, and the appropriate machine learning solution implemented.

Figure 15:
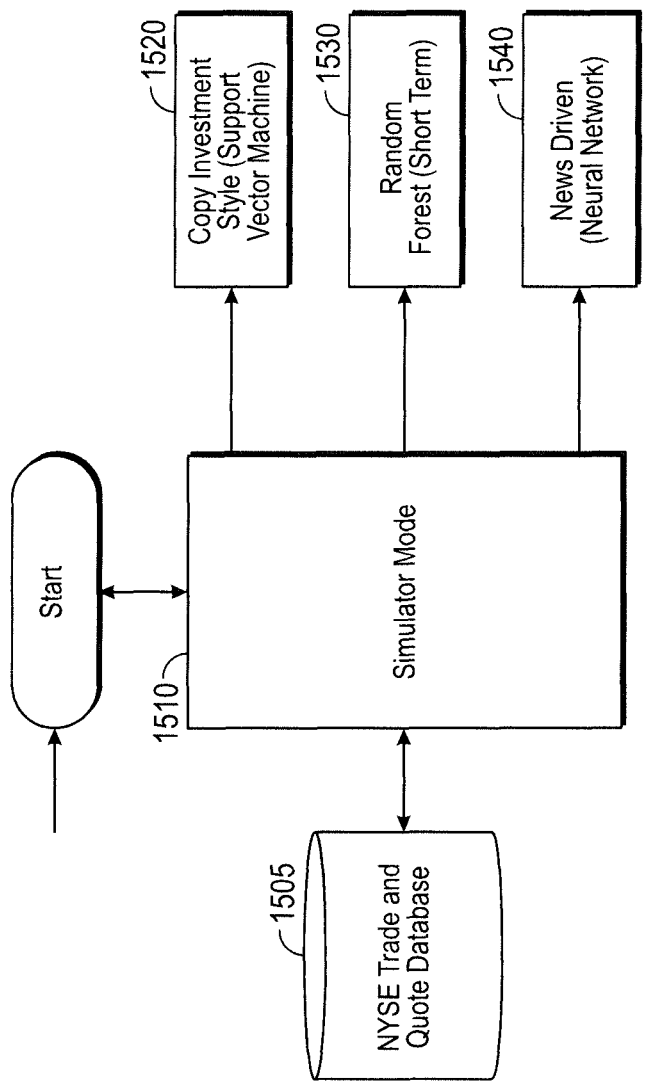
FIG. 15 is an exemplary diagram of the various machine learning solutions associated in part with the random forest application in accordance with various embodiments.

FIG. 15 is an exemplary diagram of the various machine learning solutions associated in part with the random forest application in accordance with various embodiments. In FIG. 15, there is shown a simulator mode 1510 for executing in KIRBY™ each of three states for each machine learning solution based on the NYSE® trade and quote data from a third party repository 1505 connected in the cloud. The three types of solutions are copying an investment style using an SVM model 1520, implementing a short term random forest style 1530, and implementing a news-driven neural network. In the simulator mode 1510, the user can click on which financial years it wants to simulate from 1975-Present, for the model to create. The user has three choices to simulate: Copy Investment Style(Warren Buffet(Value Investing) and James Harris Simon(Statistical Investing), Short Term investing, News Driven Investing.

Figure 16:
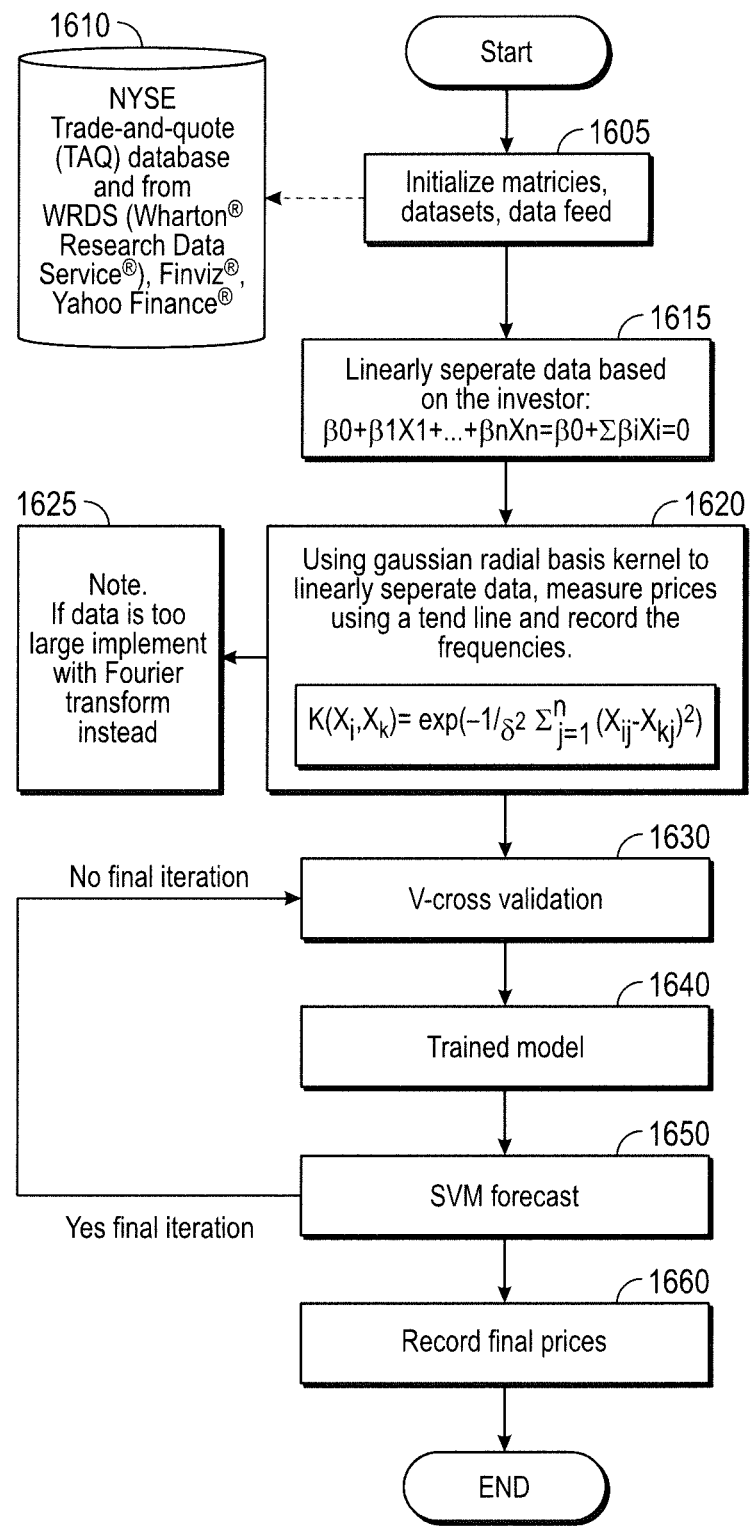
FIG. 16 is an exemplary diagram of the SVM implementation with the random forest model application in accordance with various embodiments.

FIG. 16 is an exemplary diagram of the SVM implementation with the random forest model application in accordance with various embodiments.

The random forest application may be configured in the voice-activated module via an ALEXA® or GOOGLE HOME® smart voice recognition hardware that enables instigation of the trading system i.e. the "KIRBY™" System. Initially, the user would log into his/her brokerage account and would via an interface integrated into the "KIRBY™" system enable connecting with the "KIRBY™" system (i.e. KIRBY™ implements a security authentication step). Next, the user completes a financial questionnaire provided by KIRBY™ system which includes answers yes or no answers, number answers, and multiple-choice answers. In various exemplary embodiments, KIRBY™ may complete the questionnaire automatically by a review of the user's past activity on the other online trading accounts.

Once the user completes a questionnaire or KIRBY™, KIRBY™ creates a personal profile of the user which works by parsing the numbers and answers into strings and floats. Then each data type would be converted into a $3^{rd}$ ranked tensor (income, investment goals(length of investing), expenses). Using tucker decomposition data is then converted into matrix size forms of lexicon strings and financial array objects. Tucker Decomposition can be expressed as: $x = \Sigma_{P=1}^{P} \Sigma_{Q=1}^{Q} \Sigma_{R=1}^{R} \text{Ipqrm}_r \odot i_r \odot e_r = T_{x1} M_{x2} I_{x3} E = [[T; MIE]]$. This is then transferred into the machine learning application which holds the tensor information in the newly constructed form. The Machine learning Application sends it to the simulator mode which provides the user with three options of simulating a financial portfolio.

As mentioned in FIG. 15, in the simulator mode, the user can click on which financial years it wants to simulate and the user has three choices to simulate; though additional investment styles can be implemented. In addition, real-time monitoring of the investor and the investment style is also implemented. For example, it is often the case, that a large institutional investor may acquire a small stake and then slowly increase that stake in a company; the result is the stock price is also increased as more investors take notice particularly because of the required disclosure reporting under Sarbanes Oxley. Hence, taking positions early is not only less risky but may, in fact, be more profitable before a run-up of the stock or buying occurs triggered on the institutional investor's buying pattern. Likewise, the opposite effect may occur of a sell-off and loss in price as the institutional investor liquidates his or her position.

Turning back to FIG. 16, the Copy or mimic investment style is implemented using a support vector machine learning technique. At 1610, the data, matrix information, and Data feed from NYSE Trade-and-Quote (TAQ) database and from WRDS(WHARTON® Research Data Service), Finviz and Yahoo Finance are initialized. Once data is initialized, at 1605, the data is internally plotted on a 3D axis X, Y, Z. However, separating the data shows an uneven relationship and financial points aren't showing a clear relationship between the Z and Y-axis. At 1615, this uneven relationship can be explained by this equation: $\beta 0 + \beta 1 X 1 + \ldots + \beta n X n = \beta 0 + \Sigma \beta i X i = 0$. This equation demonstrates that some of the points fall marginally on one side of the boundary while most of them fall on the other side of the boundary, this can occur through cross-validation of the SVM. However, using the Gaussian Radial Basis Kernel which is a machine learning function that is used when data is linearly inseparable. Gaussian RBF works by separating the data by measuring the squared Euclidean distance between the two vectors at 1620. This can be expressed as $K(x_i,x_k)=\exp(-1/\delta^2\Sigma_{j=1}{}^n(x_{ij}-x_{kj})^2)$. If the data has the same squared Euclidean distance, there is a relationship else and reorganizes the data, KIRBY uses Fourier transformations to separate the data. This would work by separating the data onto a spherical coordinate system and if the data has the same Euclidean radius, same polar angle in the zenith direction of azimuthal angle. A stock price volatility chart will then be internally plotted which will be days vs stock prices. This Fourier transformation will be applied to every stock in different sectors. Either the Gaussian RBF method or the Fourier Transformation method works, the subsequent step would then be to Cross Validate at 1630 the portfolio with the previous year and create a trained model at 1640. The SVM at 1650 would predict the price based on your portfolio and then compare it with the actual price. For a Warren Buffet style model stocks would be purchased using valuation metrics, while using a James Harris Simons—RENNAISSANCE FUNDS® method stocks would be purchased using statistical arbitrage and statistical analysis. The model would keep iterating the portfolio and send the final results to the user in 1660.

Figure 17:
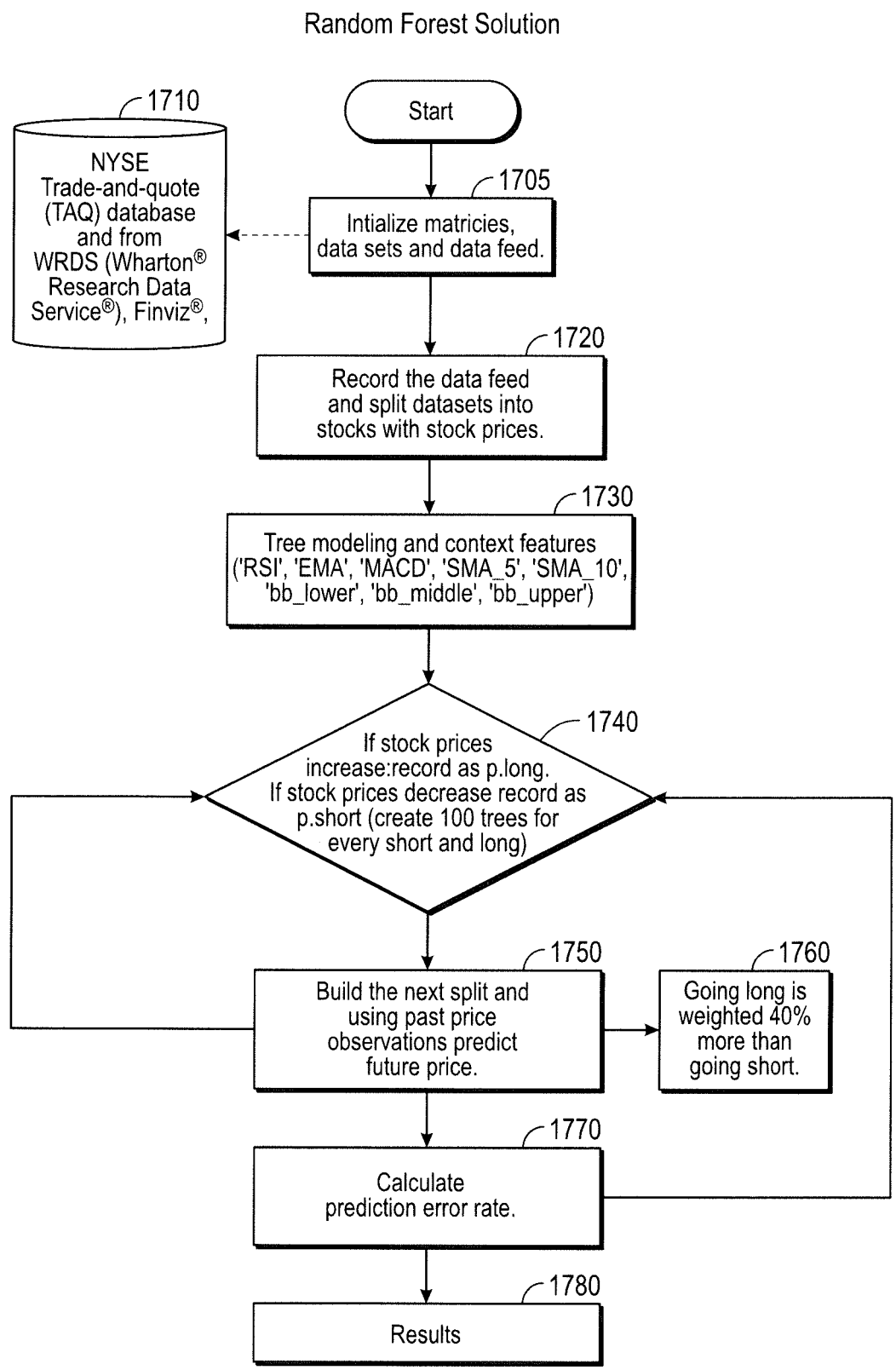
FIG. 17 is an exemplary diagram of an implementation using tree modeling and contextual modeling with the random forest model application in accordance with various embodiments.

FIG. 17 is an exemplary diagram of an implementation using tree modeling and contextual modeling with the random forest model application in accordance with various embodiments.

The Short-Term investing style is implemented by using the machine learning technique of Random Forest. Random Forest is essentially an ensemble learning system that uses regression by the construction of multiple decision trees. The first step in the short-term investing process would be to initialize the matrix information at 1705, non-stationary data, (data that cannot be predicted or modeled because the stochastic process is varied with cyclical time) and data feeds (NYSE Trade-and-Quote (TAQ) database and from WRDS(WHARTON® Research Data Service), Finviz) at 1710. The data-feed will be internally reported and each stock dataset will be split into a spreadsheet that contains data from 7 days and stretches back from 700 days at 1720. The Random Forest will be trading 90 minutes from the market open and selling 20 minutes from the market close to create a univariate model. The next step of the random forest model is to create a decision tree at 1730 which will have a depth of 20 branches and carry the context features of (RSI','EMA','MACD', 'SMA_5', 'SMA_10','bb_lower', 'bb_middle','bb_upper'). Each Decision tree will then predict the stock price in 1740 and compare each simulated trade at 1750 with the actual trade. At 1760, since KIRBY is a conservative investing machine, going long will weigh 40% more on the portfolio, when comparing going short. The predicted price will be sent to the user at 1760 and the comparison price will also be sent as well at 1770 to calculate prediction error rates with the results 1780 achieved.

Figure 18:
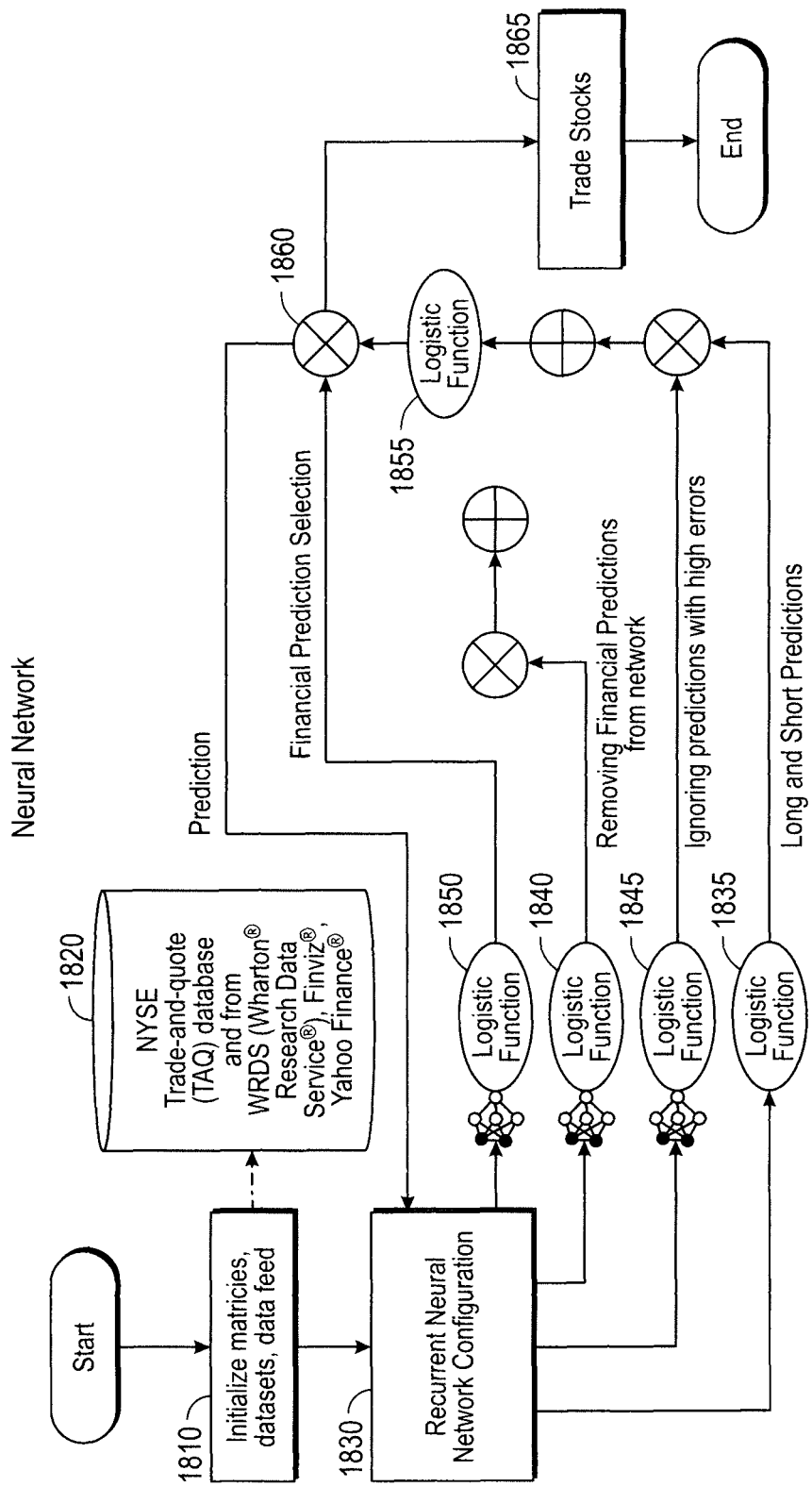
FIG. 18 is an exemplary diagram of an implementation using neural network modeling with the random forest model application in accordance with various embodiments.

FIG. 18 is an exemplary diagram of an implementation using neural network modeling with the random forest model application in accordance with various embodiments. In FIG. 18, similar to FIG. 17, the matrices, datasets, and data feeds at 1810 are initialized and data is received from the $3^{rd}$ party NYSE® of the like database of stock quotes, research data, and trading data. Then at 1830, a recurrent neural network(RNN) configuration is implemented so that various connections between nodes form a directed graph along a temporal sequence for dynamic behavior analysis of each stock. When implementing the RNN, logic steps of 1835 for long short predictions, steps 1845 for ignoring predictions with high errors, steps 1840 for removing financial predictions from the network which are summed or aggregated using appropriate solutions at 1855 for associating at 1860 with the a financial prediction selected and stock trades 1865 are created as a result of the association.

Figure 19:
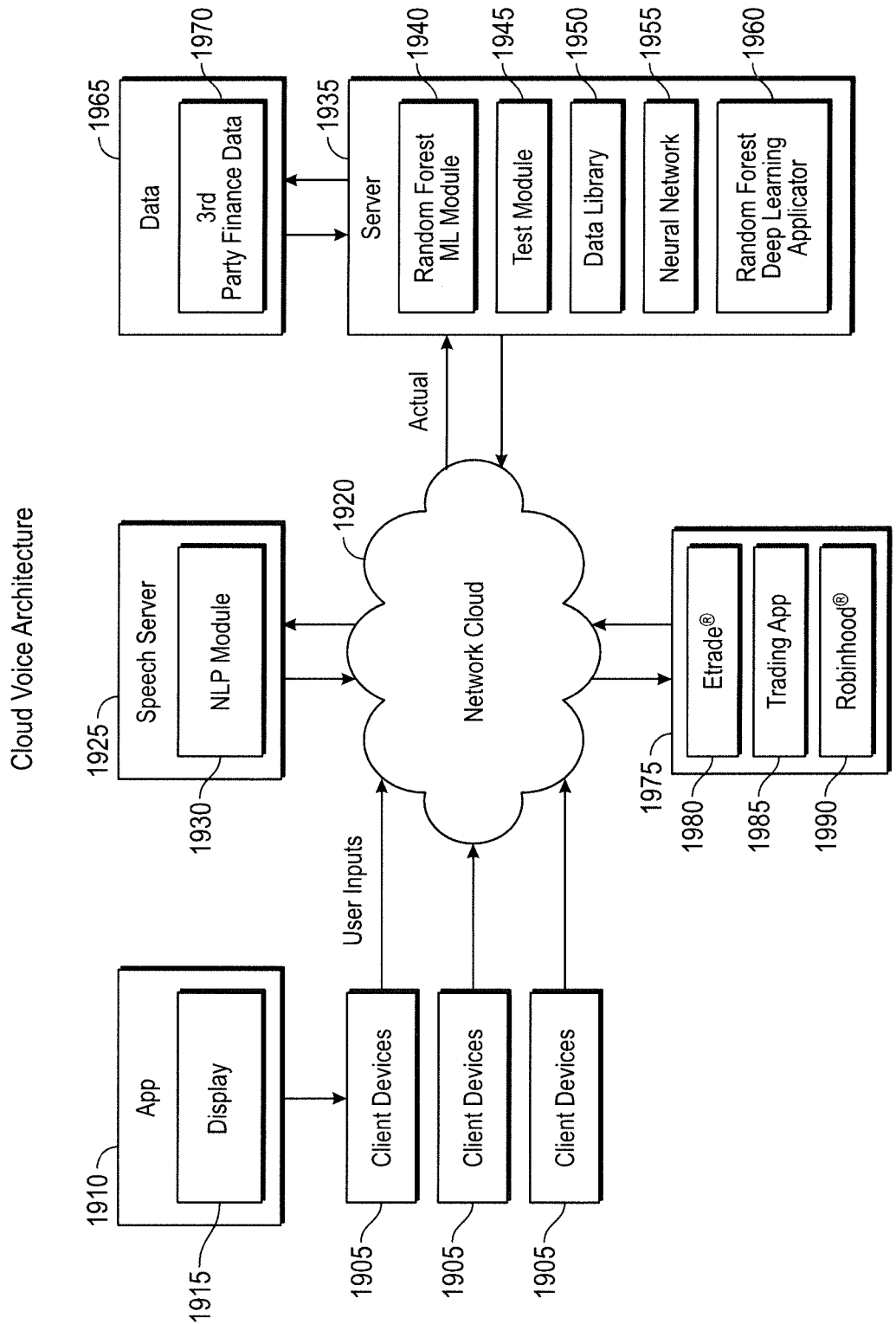
FIG. 19 is an exemplary diagram of a server architecture for the speech and audio implementation of the random forest application in accordance with various embodiments.

In FIG. 19 a cloud-based architecture for voice activation of the random forest application hosted on a connected server is illustrated. Various client devices 1905 hosting an app 1910 with a graphic user interface 1915 having a display to display stock data.

In practice, the client device 1905 may be any device, component, module, hardware and/or the like that is capable of communicating with the voice server 1925, the random forest application server 1935, brokerage server 1975, trading app server 1985 over a network 1920. For example, depending on the embodiment, client device 1905 may be realized as a conventional personal computer, portable computer, a tablet computer, workstation and/or other computing system, a mobile (or cellular) telephone, a smartphone, a personal digital assistant, a video game player, and/or any other device capable of receiving media data via the network 1920 and presenting audio and/or visual content. In this regard, the client device 1905 includes a display device, such as a monitor, screen, or another conventional electronic display, capable of graphically presenting visual content, data and/or information that is generated or otherwise provided by an application executing on the client 1920. The client device 1920 may further include a user input device, such as a keyboard, a mouse, a touchscreen, or the like, capable of receiving input data and/or other information from the user of the client device 1920. The client device 1920 also includes a processing system and a data storage element (or memory) that is coupled to or otherwise accessed by the processing system and stores programming instructions that, when read and executed, cause the processing system of the client device 1920 to generate one or more applications 1910 executing thereon and perform various tasks, functions, processes and/or operations and support the subject matter described herein. The processing system may be realized as any sort of processor, microprocessor, microcontroller, digital signal processor, or any other suitable processing device, or any suitable combination thereof.

In addition, the voice server 1930 (i.e. voice recognition service) as a voice command service that receives and sends audio package requests from the client device 1905; the voice requests are processed by voice server 1930 to by a third-party NLP process server 1930 for parsing and semantic recognition of the streamed audio packets. The NLP process server 1930 returns the recognized text from the NLP processing of the audio packets and sends the accepted or recognized audio packages as a text set for further analysis to the random forest machine learning model 1940 hosted by the machine learning server 1935.

The voice service (i.e., the third-party automated speech recognition service) is hosted on a separate server and could be any one of a plethora of such NLP solutions available on the market. For example, NUANCE® ASR or GOGGLE® ASR Services can be implemented to translate the audio packages to texts. If the ASR service fails, then an error code can be generated, and a corresponding error text would be sent to the client device 1905 of the result.

After the NLP process server 1925 completes the voice recognition step and converts the voice (i.e., the audio package) to text, the machine learning server 1935 that hosts the random forest machine learning application 1940, executes the random forest ML application that sends requests for stock data to a $3^{rd}$ party content stock data source 1965 that contains stock databases (or multi-tenant databases of stock information) 1970 and retrieves the relevant stock information in a selected time period or in real-time. The random forest ML application 1940 implements a test module 1945 for testing predictive stock data, implements raw data of stocks into a deep learning random forest application 1960 of decision making and weighted trees. A data library 1950 source is also included that allows retrieval of news, other investor trading styles, historical stock information for use in training by supervised and unsupervised learning the neural network 1955. Additionally, user account information, past profile information, and past trading and risk tolerance attributes are retrieved via the trading app 1985, brokerage trading app 1990 (in this instance the ROBINHOOD® trading app) and the E-trade brokerage site app 1980. Finally, the predicted or estimated results are sent back to the client devices 1905 for display 1915 so that the user can make trading decisions.

FIG. 20 is an exemplary chart of a screenshot of a graph of a sample portfolio results derived by the implementation of the random forest model application in accordance with various embodiments. The screenshot is a graphic user interface that includes items 2005 of performance, risk metrics and source code for the random forest application. In the performance item, further analytics are created that include analytics 2010 of return, alpha, beta, Sharpe, volatility and max drawdown. These analytics 2010 are exemplary in nature and it is contemplated a variety of analytics may be used as desired by the user.

Figure 21:
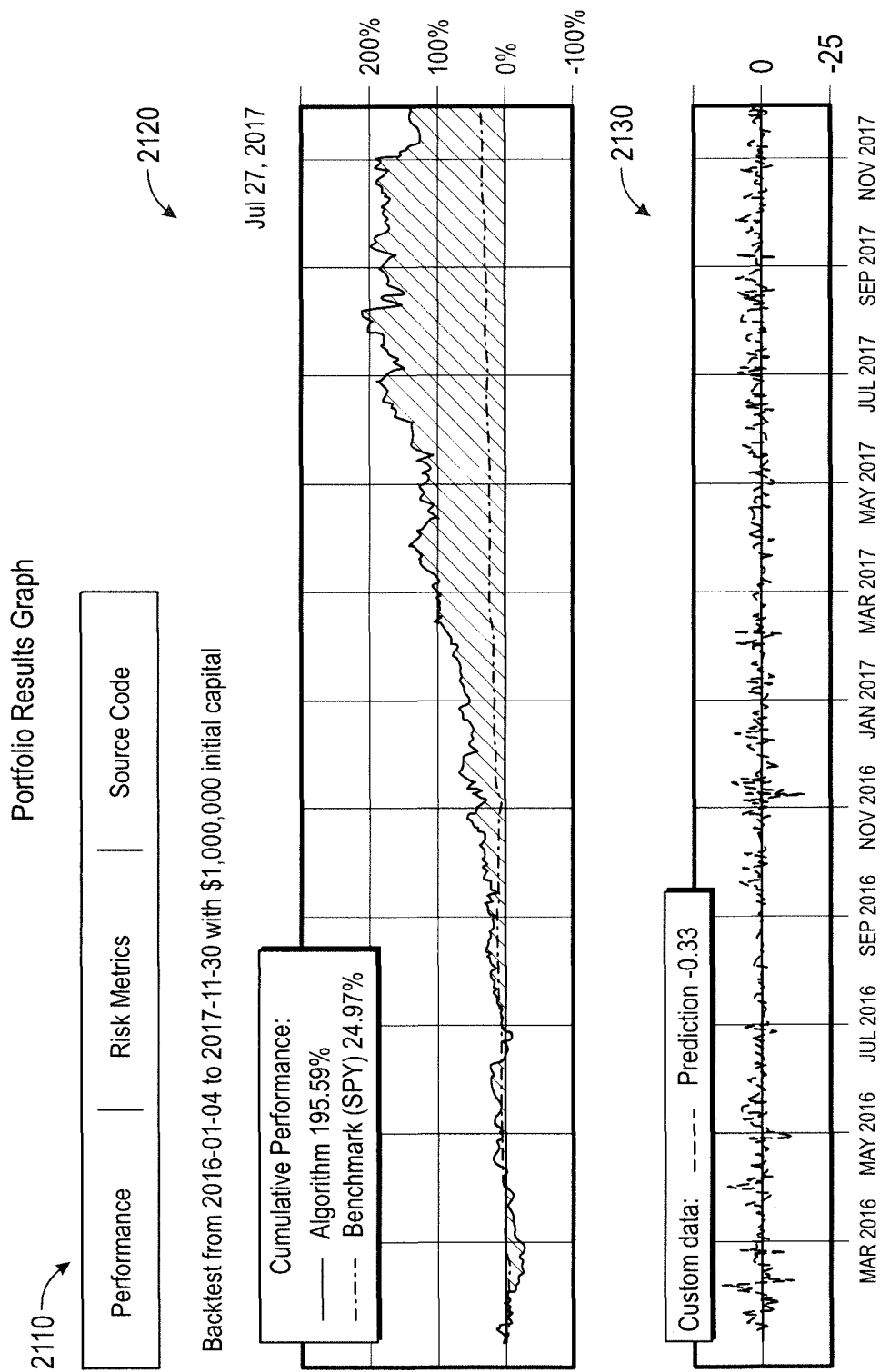
FIG. 21 is an exemplary table of results of a sample portfolio's return on investment by the implementation of the random forest application in accordance with various embodiments.

FIG. 21 illustrates the overall graph of the algorithm's performance in comparison with its benchmark in accordance with various embodiments. The portfolio includes performance, risk metrics, and source code tabs 2110 and a graph of a backtest over a period of time for $1,000,000 USD of capital at 2120. Below the graph is the custom data 2130, which depicts the random forest actually buying stocks when the green line goes above the median line (includes going long or short), or selling stocks when the green line dips below the median line (also includes selling or covered calls). Based on the information in the graph, it is quite clear that the algorithm clearly surpassed the benchmark standard of the S&P 500.

In an exemplary embodiment, a selection of stocks that was made of Amazon, Apple, Boeing, Citi Group, Disney, Ford, Icahn Enterprises, Nvidia, Tesla, Pandora, and Velocity Shares Daily 2×VIX ST ETN. The program was developed using RStudio and Python, both of which have their pros and cons, which are illustrated below. After several trials and error attempts—it was decided to use Quantopian.com.

The final outcome of the algorithm (i.e. random forest application solution) showed that over a course of one year, a profitable gain of over 138.51% was made in the stock market by using a diversified asset portfolio, which included several different stocks such as Amazon (AMZN), Apple (AAPL), Boeing (BA), Citi Group (C), Disney (DIS), Ford Motors (F), Icahn Enterprises (IEP), Nvidia (NVDA), Pandora (PNDORA), Tesla (TSLA), and Velocity Shares Daily (TVIX) which easily surpass the standard S&P 500 Benchmark, which made around 33.48% during the same time frame.

The algorithm shows that using random forests makes investing stocks easier and more accurate. Results in Portfolio Performance image show that my trading algorithm outperformed the S&P benchmark by over 80%, delivering very profitable returns. The Risk Metrics (in FIG. 20) image shows the various risk metrics (these are specific factors that are quantifiable by risk measure), which include the total returns, the Sharpe Ratio (compares the return of an investment to its risk), the Sortino Ratio (a variation of the Sharpe Ratio, it basically differentiates harmful volatility of a specific stock from its total overall volatility), max drawdown (this is the measure of maximum loss between a peak and a trough of an asset portfolio), benchmark returns (a standard criterion against which the performance of a certain stock can be measured), and volatility (determined by current trends in stock price levels). The total returns are truly exceptional, while the beta is a bit high. The average beta levels should be lower than 1.0, but the beta is high because of the constant trading occurring in the portfolio. Thus, showing its more volatile than the index. The Sharpe ratio of 1.09 is very good and a Sortino ratio of 1.55 shows a good risk-adjusted return. The volatility is measured by the standard deviation in returns.

Step 1 included an intense study of all of the concepts outlined above in the investigative process: choosing a proper Global Context for my algorithm, starting my Process Journal, and keeping track of all sources used in the duration of this project. In addition, I kept a working list of all Learner Profiles and ATL skills that I was to employ during the course of this project. Step 2 included a more in-depth study of the stock market along with understanding the basic concepts of machine learning and comprehending the financial time series. The Process Journal was updated as required along with the sources. Step 3 was defined by my learning how to properly code. Also tested were various computer languages such as R-Studio, Python, and other open-source platforms such as Quantopian.com, which combines Python with various trading functions. Step 4 creates the algorithm itself using Quantopian.com and to build an algorithm that would use randomized values from historical data to predict stock prices in the future. The selection of stocks was carefully chosen and then import packages (such as ScKit-Learn, which is a free online Python-based machine learning library) were used to import the basic random forest technique itself. Next, to build the algorithm and then "train" the algorithm was performed by creating a set of estimators (decision trees—these are basically pathways that depict various outcomes based on certain decisions) that would optimize my stock investment portfolio. In addition, there is included a set of stock indicators such as Simple Moving Average, Relative Strength Index, Moving Average Convergence Divergence Signal, Exponential Weighted Moving Average, and Bollinger Bands—all of which help analyze and track stock movements and prices.

While building the algorithm itself, it was necessary to develop detailed criteria and specifications that the algorithm (i.e. random forest application solutions) needed to meet—this included functionality such as the daily monitoring of the stock prices, moving average indicators, correctly identifying all stock trade opportunities, and placing orders to buy/sell stocks. When the appropriate conditions were met, the algorithm ran very smoothly. Also, additional functionality was implemented of various stock market indicators to measure the daily stock growth for each week and to also measure the timing of each of the stock buys.

Below is an example snippet of code in python to implement the random forest application.

```
5       from sklearn.ensemble import RandomForestRegressor
6
7       from quantopian.pipeline. factors import SimpleMovingAverage, RSI,
MovingAverageConvergenceDivergenceSignal, ExpontialWeightec
8       from quantopian.pipeline.data import Fundamentals
9       import numpy as np
10      import pandas as pd
11
12
13      def initialize(context):
14
15
16
17
18      context.security_list =[ sid(24),
19          sid(39840),
20          sid(16841),
21          sid(698),
22          sid(19725),
23          sid(41579),
24          sid(1335),
25          sid(2673),
26          sid(2190),
27          sid(40515),
28          sid(100)
29
30
31
32          ]
33      context.models ={ }
34      context.prediction = np.zeros_like(context.security_list)
35
36      context.lookback = 7 # Look back 7 days
37      context.history_range = 700 # Only consider the past 600 days' history
38
39      # Generate a new model every week
40      schedule_function(create_model,       date rules.week end( ),
time_rules.market_close(minutes=20))
41
42      # Trade at the start of every day
43      schedule_function(trade,              date_rules.every_day( ),
time_rules.market_open(minutes=90))
44      # my training data
45      #context.features = ['RSI', 'EMA', 'MACD', 'SMA_10', 'bb_lower',
'bb_middle', 'bb_upper', 'diluted_eps', 'growth_score', 't
```

The snippet code above includes the stock picks in a diversified asset portfolio and various performance indicators [such as Simple Moving Average (SMA), Relative Strength Index (RSI), Moving Average Convergence Divergence Signal (MACDS), Exponential Weighted Moving Average (EWMA), and Bollinger Bands (BBands)] found within a string of code. All of these performance indicators help analyze and track stock movements and their prices.

In various exemplary embodiments, the present disclosure describes a machine learning technique known as "random forests" and apply it directly to stock market price movements. Basically, the random forest algorithm implemented here combines the method of using decision trees (a multifaceted series of pathways depicting various questions with their possible outcomes) to eventually create a complex machine learning algorithm that relies on data and statistics.

The random forest solution presented surpassed the S&P 500 Benchmark by over 90% in one year, and I was able to do it with a very diversified portfolio, which included both extremely leveraged and volatile assets. The latency of the random forest algorithm was not within desired parameters due to the processing required and bandwidth available which resulted in significant slowness-because of the number of parameters (decision trees) that I had built into the model (100 estimators=100 decision trees), which then influenced the latency of the trade and higher processing capabilities are required to high-frequency trading activities.

Improvements to my algorithm can include the combination of a support vector machine, or maybe using a structural kernel method to improve the overall efficiency. I may also try a totally different strategy and use neural networks to build a more complex system and forecast stock price trends in a more accurate manner as a possible future endeavor.

When using random forest algorithms, the amount of data received from the datasets (stock market prices), is extremely high and can lead to fatal errors in the algorithm if not properly addressed. To prevent this from occurring in random forest regressions, the algorithm calculates a variance reduction using the mean square error. The MSE here is defined as the Mean Square Error. Where n is the number of instances, Y is the label of the instance, and I=1. This equation was used to prevent the overfitting of data by reducing the extraneous stock data in order for the random forest to make more accurate predictions.

In random forest regression, decision trees are equal to the average of all individual trees. Where $p(y|v)$ is probability density function, which is used to interpret randomness in a data array, matrix or set. The probability density function basically defines a probability distribution for a continuous random variable. Lastly, T=trees.

This equation was used to interpret daily data, and its exact timing depended upon the parameters built into the trading functions (such as the time the market opens and the time the market closes).

For the purpose of this disclosure, random forest algorithms are defined as machine learning algorithm techniques that are used to create predictive models for either classification or regression purposes. The technique builds entire "forests" of random and uncorrelated decision trees to make the best possible decision using the data/information provided. Random forests are characterized by Decision Trees, Judicious Randomization and Ensemble Learning.

Decision Trees are the basic building blocks of random forests. The decision tree is intuitive and predictive models that use binary split nodes each time certain criteria are met and the decision is made.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic is shown depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit include custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices, or the like. Modules may also be implemented in software for execution by various types of processors. An identified module of executable code may, for instance, include one or more physical or logical modules of computer instructions that may, for instance, be organized as an object, procedure, or function. Nevertheless, the executables of an identified module need not be physically located together but may include disparate instructions stored in different locations that, when joined logically together, include the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The invention claimed is:

1. A method for providing stock predictive information by a cloud-based computing system implementing a random forest application, the method comprising:

executing the random forest application with a hardware-based processing system comprising the random forest application coupled to a neural network and a Natural Language Processor (NLP) server that enables parsing and semantic recognition of converted text from a plurality of streamed audio data, wherein the hardware-based processing system performs the operations of:

initiating the random forest application, by providing a voice command on a client device that is routed via the NLP server, to receive input of a set of stock data;

training the neural network with a plurality of inputs of stock data for a preset number of hidden layers in the neural network, wherein one or more hidden layers comprise a sample size segregated into at least two other hidden layers comprising stock change predictions in accordance with either a long term strategy, or a short term strategy;

receiving the converted text via the NLP server with respect to the set of stock data from multiple sources of stock data that comprise brokerage accounts, content sources, and stock quote providers wherein the set of stock data at least comprises stock prices at the open and close of a market, changes in stock prices during the open and close of a market, and real-time stock data;

identifying a stock of interest by at least semantic recognition of the converted text contained in the set of stock data;

defining a range in time of the set of stock data wherein the range in time comprises: a set of stock data contained in a window defined of an initially selected month, a day or real-time period and an end of the selected month, day and real-time period;

applying a random forest model to the set of stock data by creating multiple decision trees to predict a stock price in a quantified period, amount or percentage change in a stock price;

presenting the predicted stock price in a graphic user interface; and providing alerts, messages or notifications based on output from the neural network on a display contained within the graphic user interface so that a user can trade on the stock in an anticipation of a predicted change in the stock price.

2. The method of claim 1, the random forest model further comprising:

training a prediction model based on supervised and unsupervised learning of the set of data wherein at least a supervised model uses data results that are within a range selected by a user.

3. The method of claim 2, the random forest model further comprising:

training an estimation model based on supervised and unsupervised learning of the set of data wherein at least the supervised model uses data results that are within a range selected by a user.

4. The method of claim 3, further comprising:

selecting a number for a set of decision trees based on results from the trained predictive model, wherein each decision tree receives stock data for processing to predict or estimate a change in the stock price in a selected period.

5. The method of claim 1, further comprising:

implementing a security check of the random forest application connected to a cloud-based application.

6. The method of claim 1, further comprising:

selecting one or more of a set of rules for stock selection time periods or for intraday stock movements of the set of stock of processing by the random forest application.

7. The method of claim 1, further comprising:

applying natural language processing solutions for receiving input stock data for triggering the random forest application wherein the random forest application is connected to an independent natural language processing module for receiving voice commands and sending voice results to a user.

8. The method of claim 1, further comprising:

processing by the random forest application, one or more target stocks and a corresponding target stock related information based on stock indicators comprising at least one of a simple moving average, a relative strength index, a moving average convergence divergence signal, an exponential weighted moving average, and a Bollinger band.

9. The method of claim 1, further comprising:

training the neural network using the random forest application with actual inputs for a preset number of hidden layers in the neural network-wherein each hidden layer comprising a sample size segregated into at least two other hidden layers denoting stock change predictions of long and short.

10. A cloud-based computing system implementing a decision tree model configured using a random forest application for stock change predictions, comprising:

a hardware-based processing system comprising the random forest application which is executed by the hardware-based processing system, the random forest application being coupled to a neural network and a Natural Language Processor (NLP) server that enables parsing and semantic recognition of converted text from a plurality of streamed audio data, wherein the hardware-based processing system performs the operations to:

initiate the random forest application, by providing a voice command on a client device that is routed via the NLP server, to receive input of a set of stock data;

receive the converted text via the NLP server with respect to the set of stock data from multiple sources of stock data that comprise brokerage accounts, content sources, and stock quote providers wherein the set of stock data at least comprises stock prices at the open and close of a market, changes in stock prices during the open and close of a market, and real-time stock data;

identify at least one stock of interest by at least the semantic recognition of the converted text contained in the set of stock data;

define a range in time of the set of stock data wherein the range in time comprises a set of stock data contained in a window defined of an initially selected month, a day or real-time period and an end of the selected month, day and real-time period;

apply a random forest model to the set of stock data to predict a stock price in a quantified period, amount or percentage change in a stock price;

present changes in the predicted stock price in a graphic user interface;

provide alerts, messages or notifications based on output from the neural network on a display contained within the graphic user interface for a user to make trading decisions of a stock based on a predicted change in the stock price in a select time period; and train the neural network with inputs of stock data for a preset number of hidden layers in the neural network, wherein one or more hidden layers comprise a sample size segregated into at least two other hidden layers comprising stock change predictions in accordance with either a long term strategy, or a short term strategy.

11. The cloud-based computing system according to claim 10, further comprising:

the random forest application that when executed by a hardware-based processing system is configurable to cause a machine learning model for implementing the random forest application to:

train a prediction model based on supervised and unsupervised learning of the set of data wherein at least a supervised model uses data results that are within a range selected by a user.

12. The cloud-based computing system according to claim 11, further comprising:

the random forest application that when executed by a hardware-based processing system is configurable to cause a machine learning model for implementing the random forest application to:

train an estimation model based on supervised and unsupervised learning of the set of data wherein at least the supervised model uses data results that are within a range selected by a user.

13. The cloud-based computing system according to claim 11, further comprising:

the random forest application that when executed by a hardware-based processing system is configurable to cause a machine learning model for implementing the random forest application to:

select a number for a set of decision trees based on results from the trained predictive model, wherein each decision tree receives stock data for processing to predict or estimate a change in the stock price in a selected period.

14. The cloud-based computing system according to claim 11, further comprising:

the random forest application that when executed by a hardware-based processing system is configurable to cause a machine learning model for implementing the random forest application to:

configure a security check prior to the execution of the random forest application connected to a cloud-based application.

15. The cloud-based computing system according to claim 11, further comprising:

the random forest application that when executed by a hardware-based processing system is configurable to cause a machine learning model for implementing the random forest application to:

select one or more of a set of rules for stock selection time periods or for intraday stock movements of the set of stock of processing by the random forest application.

16. The cloud-based computing system according to claim 11, further comprising: the random forest application that when executed by a hardware-based processing system is configurable to cause a machine learning model for implementing the random forest application to:

apply natural language processing solutions to receive input stock data to trigger the random forest application wherein the random forest application is connected to an independent natural language processing module to receive voice commands and to send voice results to a user.

17. The cloud-based computing system according to claim 11, further comprising:

the random forest application that when executed by a hardware-based processing system is configurable to cause a machine learning model for implementing the random forest application to:

train a neural network using the random forest application with actual inputs for a preset number of hidden layers in the neural network wherein each hidden layer comprising a sample size segregated into at least two other hidden layers denoting stock change predictions of long and short.

18. The cloud-based computing system according to claim 11, further comprising:

the random forest application that when executed by a hardware-based processing system is configurable to cause a machine learning model for implementing the random forest application to:

process by the random forest application, one or more target stocks which correspond to a target stock related information based on stock indicators that comprise at least one of a simple moving average, a relative strength index, a moving average convergence divergence signal, an exponential weighted moving average, and a Bollinger band.

19. A brokerage server system comprising a hardware-based processor and memory, wherein the memory comprises processor-executable instructions encoded on a non-transient processor readable media, wherein the processor-executable instructions that when executed by the processor perform a method comprising the steps of:

executing a stock trading app to implement a voice recognition application connected to a cloud-based computing system;

executing, via the stock trading app, a random forest application coupled to a neural network and a Natural Language Processor (NLP) server that enables parsing and semantic recognition of converted text from a plurality of streamed audio data, wherein the hardware-based processing system performs the operations of:

initiating the random forest application, by providing a voice command on a client device that is routed via the NLP server, to receive input of a set of stock data;

training the neural network with a plurality of inputs of stock data for a preset number of hidden layers in the neural network, wherein one or more hidden layers comprise a sample size segregated into at least two other hidden layers comprising stock change predictions in accordance with either a long term strategy, or a short term strategy;

receiving the converted text via the NLP server with respect to the set of stock data from multiple sources of stock data that comprise brokerage accounts, content sources, and stock quote providers wherein the set of stock data at least comprises stock prices at the open and close of a market, changes in stock prices during the open and close of a market, and real-time stock data;

identifying by at least semantic recognition of the converted text a stock of interest contained in the set of stock data;

defining a range in time of the set of stock data wherein the range in time comprises: a set of stock data contained in a window defined of an initially selected month, a day or real-time period and an end of the selected month, day and real-time period; applying a random forest model to the set of stock data by creating multiple decision trees to predict a stock price in a quantified period, amount or percentage change in a stock price;

presenting the predicted stock price in a graphic user interface; and providing alerts, messages or notifications based on output from the neural network on a display contained within the graphic user interface so that a user can trade on the stock in an anticipation of a predicted change in the stock price.

20. The brokerage server system according to claim 19, further comprising:

training a prediction model based on supervised and unsupervised learning of the set of data wherein at least a supervised model uses data results that are within a range selected by a user; and training an estimation model based on supervised and unsupervised learning of the set of data wherein at least the supervised model uses data results that are within a range selected by the user.

* * * * *